United States Patent
Kondo et al.

(10) Patent No.: US 6,288,654 B1
(45) Date of Patent: Sep. 11, 2001

(54) DATA CONVERSION APPARATUS, DATA CONVERSION METHOD, AND RECORDING MEDIUM

(75) Inventors: Tetsujiro Kondo, Tokyo; Yoshinori Watanabe, Kanagawa; Kenji Tanaka, Chiba, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/455,696

(22) Filed: Dec. 7, 1999

(30) Foreign Application Priority Data

Dec. 9, 1998 (JP) .................................................... 10-368511

(51) Int. Cl.[7] ...................................................... H03M 7/00

(52) U.S. Cl. .................................. 341/50; 341/60; 341/61

(58) Field of Search .................................. 341/50, 51, 55, 341/61, 89, 59, 60, 57, 56, 93

(56) References Cited

U.S. PATENT DOCUMENTS

| | | | |
|---|---|---|---|
| 5,651,121 | * | 7/1997 | Davies .................................. 395/376 |
| 5,818,877 | * | 10/1998 | Tsai et al. ............................. 375/241 |
| 6,215,421 | * | 4/2001 | Kondo et al. .......................... 341/50 |

* cited by examiner

*Primary Examiner*—Brian Young
*Assistant Examiner*—John Nguyen
(74) *Attorney, Agent, or Firm*—Frommer Lawrence & Haug LLP; William S. Frommer

(57) ABSTRACT

A data conversion apparatus for converting first data into second data. An input section receives the first data. A conversion section converts the first data into the second data by moving each of the first data to the position of second positional information that is represented by a sequence of numbers that is obtained by reversing the order of a sequence of numbers of first positional information that is an N-ary number (N: a natural number that is greater than or equal to 2) and represents the position of each of the first data. The data conversion apparatus can easily distribute data existing in a temporally or spatially localized region.

13 Claims, 23 Drawing Sheets

IMAGE PROCESSING SYSTEM

FIG. 6A

HORIZONTAL ADDRESS

|   | 0 | 1 | 2 | 3 | 4 | 5 | 6 | 7 |
|---|---|---|---|---|---|---|---|---|
| 0 | (0, 0) | (1, 0) | (2, 0) | (3, 0) | (4, 0) | (5, 0) | (6, 0) | (7, 0) |
| 1 | (0, 1) | (1, 1) | (2, 1) | (3, 1) | (4, 1) | (5, 1) | (6, 1) | (7, 1) |
| 2 | (0, 2) | (1, 2) | (2, 2) | (3, 2) | (4, 2) | (5, 2) | (6, 2) | (7, 2) |
| 3 | (0, 3) | (1, 3) | (2, 3) | (3, 3) | (4, 3) | (5, 3) | (6, 3) | (7, 3) |
| 4 | (0, 4) | (1, 4) | (2, 4) | (3, 4) | (4, 4) | (5, 4) | (6, 4) | (7, 4) |
| 5 | (0, 5) | (1, 5) | (2, 5) | (3, 5) | (4, 5) | (5, 5) | (6, 5) | (7, 5) |

VERTICAL ADDRESS (7, 0) ← PIXEL

FIG. 6B

HORIZONTAL ADDRESS

|   | 0 | 1 | 2 | 3 | 4 | 5 | 6 | 7 |
|---|---|---|---|---|---|---|---|---|
| 0 | (0, 0) | (1, 0) | (2, 0) | (3, 0) | (4, 0) | (5, 0) | (6, 0) | (7, 0) |
| 1 | (0, 1) | (1, 1) | (2, 1) | (3, 1) | (4, 1) | (5, 1) | (6, 1) | (7, 1) |
| 2 | (0, 2) | (1, 2) | (2, 2) | (3, 2) | (4, 2) | (5, 2) | (6, 2) | (7, 2) |
| 3 | (0, 3) | (1, 3) | (2, 3) | (3, 3) | (4, 3) | (5, 3) | (6, 3) | (7, 3) |
| 4 | (0, 4) | (1, 4) | (2, 4) | (3, 4) | (4, 4) | (5, 4) | (6, 4) | (7, 4) |
| 5 | (0, 5) | (1, 5) | (2, 5) | (3, 5) | (4, 5) | (5, 5) | (6, 5) | (7, 5) |
| 6 | (0, 6) | (1, 6) | (2, 6) | (3, 6) | (4, 6) | (5, 6) | (6, 6) | (7, 6) |
| 7 | (0, 7) | (1, 7) | (2, 7) | (3, 7) | (4, 7) | (5, 7) | (7, 7) | (7, 7) |

VERTICAL ADDRESS (7, 6), (7, 7) ← DUMMY DATA

FIG. 7A

HORIZONTAL ADDRESS

|   | 0 | 1 | 2 | 3 | 4 | 5 | 6 | 7 |
|---|---|---|---|---|---|---|---|---|
| 0 | (0, 0) | (4, 0) | (2, 0) | (6, 0) | (1, 0) | (5, 0) | (3, 0) | (7, 0) |
| 1 | (0, 1) | (4, 1) | (2, 1) | (6, 1) | (1, 1) | (5, 1) | (3, 1) | (7, 1) |
| 2 | (0, 2) | (4, 2) | (2, 2) | (6, 2) | (1, 2) | (5, 2) | (3, 2) | (7, 2) |
| 3 | (0, 3) | (4, 3) | (2, 3) | (6, 3) | (1, 3) | (5, 3) | (3, 3) | (7, 3) |
| 4 | (0, 4) | (4, 4) | (2, 4) | (6, 4) | (1, 4) | (5, 4) | (3, 4) | (7, 4) |
| 5 | (0, 5) | (4, 5) | (2, 5) | (6, 5) | (1, 5) | (5, 5) | (3, 5) | (7, 5) |
| 6 | (0, 6) | (4, 6) | (2, 6) | (6, 6) | (1, 6) | (5, 6) | (3, 6) | (7, 6) |
| 7 | (0, 7) | (4, 7) | (2, 7) | (7, 7) | (1, 7) | (5, 7) | (3, 7) | (7, 7) |

VERTICAL ADDRESS

FIG. 7B

HORIZONTAL ADDRESS

|   | 0 | 1 | 2 | 3 | 4 | 5 | 6 | 7 |
|---|---|---|---|---|---|---|---|---|
| 0 | (0, 0) | (4, 0) | (2, 0) | (6, 0) | (1, 0) | (5, 0) | (3, 0) | (7, 0) |
| 1 | (0, 4) | (4, 4) | (2, 4) | (6, 4) | (1, 4) | (5, 4) | (3, 4) | (7, 4) |
| 2 | (0, 2) | (4, 2) | (2, 2) | (6, 2) | (1, 2) | (5, 2) | (3, 2) | (7, 2) |
| 3 | (0, 6) | (4, 6) | (2, 6) | (6, 6) | (1, 6) | (5, 6) | (3, 6) | (7, 6) |
| 4 | (0, 1) | (4, 1) | (2, 1) | (6, 1) | (1, 1) | (5, 1) | (3, 1) | (7, 1) |
| 5 | (0, 5) | (4, 5) | (2, 5) | (6, 5) | (1, 5) | (5, 5) | (3, 5) | (7, 5) |
| 6 | (0, 3) | (4, 3) | (2, 3) | (6, 3) | (1, 3) | (5, 3) | (3, 3) | (7, 3) |
| 7 | (0, 7) | (4, 7) | (2, 7) | (7, 7) | (1, 7) | (5, 7) | (3, 7) | (7, 7) |

VERTICAL ADDRESS

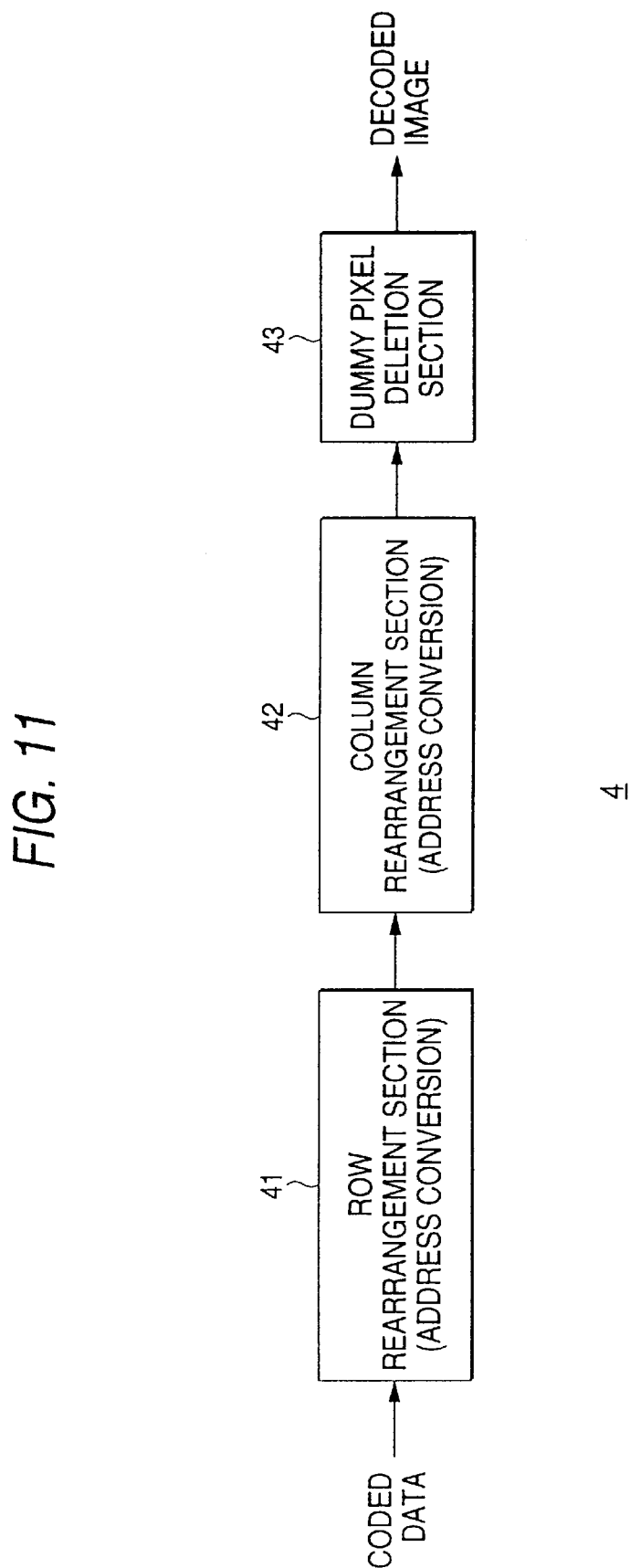

EXAMPLE OF INFORMATION RESTORATION UTILIZING UNIFORM DISTRIBUTION CONVERSION
IF IMAGE IS SUBJECTED TO ADDRESS CONVERSION, OUTLINE OF ORIGINAL IMAGE CAN BE RESTORED FROM ITS PORTION
FIG. 13A
ORIGINAL SPACE
FIG. 13B
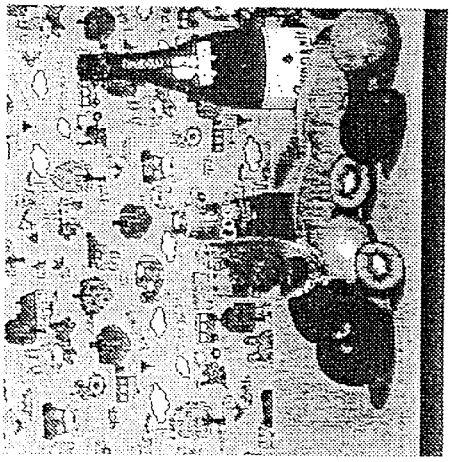
ADDRESS-CONVERTED SPACE
FIG. 13C
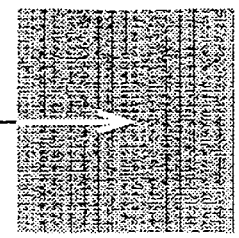
FIG. 13D
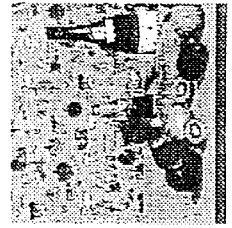

FIG. 22A

HORIZONTAL ADDRESS

|  | 0 | 1 | 2 | 3 | 4 | 5 | 6 | 7 |
|---|---|---|---|---|---|---|---|---|
| 0 | (0, 0) | (4, 0) | (2, 0) | (6, 0) | (1, 0) | (5, 0) | (3, 0) | (7, 0) |
| 1 | (0, 4) | (4, 4) | (2, 4) | (6, 4) | (1, 4) | (5, 4) | (3, 4) | (7, 4) |
| 2 | (0, 2) | (4, 2) | (2, 2) | (6, 2) | (1, 2) | (5, 2) | (3, 2) | (7, 2) |
| 3 | (0, 6) | (4, 6) | (2, 6) | (6, 6) | (1, 6) | (5, 6) | (3, 6) | (7, 6) |
| 4 | (0, 1) | (4, 1) | (2, 1) | (6, 1) | (1, 1) | (5, 1) | (3, 1) | (7, 1) |
| 5 | (0, 5) | (4, 5) | (2, 5) | (6, 5) | (1, 5) | (5, 5) | (3, 5) | (7, 5) |
| 6 | (0, 3) | (4, 3) | (2, 3) | (6, 3) | (1, 3) | (5, 3) | (3, 3) | (7, 3) |
| 7 | (0, 7) | (4, 7) | (2, 7) | (7, 7) | (1, 7) | (5, 7) | (3, 7) | (7, 7) |

VERTICAL ADDRESS

FIG. 22B

HORIZONTAL ADDRESS

|  | 0 | 1 | 2 | 3 | 4 | 5 | 6 | 7 |
|---|---|---|---|---|---|---|---|---|
| 0 | (0, 0) | (4, 0) | (2, 0) | (6, 0) | (1, 0) | (5, 0) | (3, 0) | (7, 0) |
| 1 | (0, 4) | (4, 4) | (2, 4) | (6, 4) | (1, 4) | (5, 4) | (3, 4) | (7, 4) |
| 2 | (0, 2) | (4, 2) | (2, 2) | (6, 2) | (1, 2) | (5, 2) | (3, 2) | (7, 2) |
| 3 | (0, 1) | (4, 1) | (2, 1) | (6, 1) | (1, 1) | (5, 1) | (3, 1) | (7, 1) |
| 4 | (0, 5) | (4, 5) | (2, 5) | (6, 5) | (1, 5) | (5, 5) | (3, 5) | (7, 5) |
| 5 | (0, 3) | (4, 3) | (2, 3) | (6, 3) | (1, 3) | (5, 3) | (3, 3) | (7, 3) |

VERTICAL ADDRESS

DATA CONVERSION APPARATUS, DATA CONVERSION METHOD, AND RECORDING MEDIUM

BACKGROUND

1. Field of the Invention

The present invention relates to a data conversion apparatus and a data conversion method, a provider, and a data conversion system. In particular, the invention relates to a data conversion apparatus and a data conversion method, a provider, and a data conversion system which, for example, make it possible to easily distribute data that exist in a local region and easily concentrate distributed data in a local region.

2. Background of the Invention

For example, in the case of transmitting a series of certain data, to prevent noise or errors from being concentrated at a certain location of the series of data, the series of original data is transmitted after it is converted into another series in which data exiting in a local region of the series of original data are distributed.

Incidentally, among methods of distributing data existing in a temporally or spatially localized (hereinafter referred to as "localized" where appropriate) region is a method using random numbers. In this method, the order of a certain series of data is changed according to random numbers, whereby the series of original data is converted into another series of data in which data that were localized in the series of original data are distributed.

However, to inversely convert a series of converted data obtained by conversion using random numbers into a series of original data, that is, to concentrate distributed data in the original local region, a random sequence or a seed that was used in the conversion is necessary, that is, an initial value is necessary that is given to a prescribed recurrence formula in a case where random numbers are generated according to the recurrence formula.

SUMMARY OF THE INVENTION

An object of the present invention is to solve the above problem.

To attain the above object, the invention provides a data conversion apparatus for converting first data into second data, comprising an input section for receiving the first data; and a conversion section for converting the first data into the second data by moving each of the first data to a position of second positional information that is represented by a sequence of numbers that is obtained by reversing order of a sequence of numbers of first positional information that is an N-ary number and represents a position of each of the first data, where N is a natural number that is greater than or equal to 2.

BRIEF DESCRIPTION OF THE DRAWINGS

FIG. 6A is a first chart for description of a process that is executed by a dummy pixel addition section 21 shown in FIG. 5;

FIG. 6B is a second chart for description of the process that is executed by the dummy pixel addition section 21 shown in FIG. 5;

FIG. 7A is a first chart for description of a process that is executed by a column rearrangement section 22 shown in FIG. 5;

FIG. 7B is a second chart for description of a process that is executed by a row rearrangement section 23 shown in FIG. 5;

FIG. 11 is a first functional block diagram of the decoder 4 shown in FIG. 1;

FIG. 13A is a halftone photograph displayed on a display that shows an image before execution of bit order reversing;

FIG. 13B is a halftone photograph displayed on the display that shows an image that is obtained by performing bit order reversing on the image of FIG. 13A;

FIG. 13C is a halftone photograph displayed on the display that shows an image obtained by cutting out part of the image of FIG. 13B;

FIG. 13D is a halftone photograph displayed on the display that shows an image obtained by performing bit order reversing on the image of FIG. 13C;

FIG. 22A is a chart showing a process that is executed by a dummy pixel deletion section 24 shown in FIG. 21;

FIG. 22B is a chart showing the process that is executed by the dummy pixel deletion section 24 shown in FIG. 21;

DESCRIPTION OF THE PREFERRED EMBODIMENTS

Embodiments of the present invention will be hereinafter described with reference to the accompanying drawings.

Figure 1:
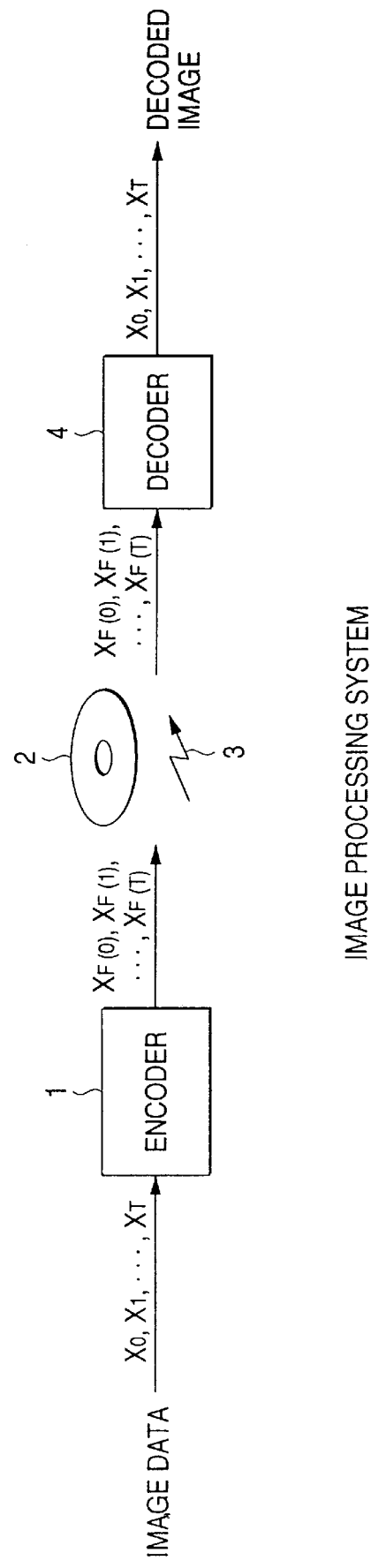
FIG. 1 A block diagram showing an example configuration of an image processing system according to an embodiment of the present invention.

FIG. 1 shows an example configuration of an image processing system according to an embodiment of the invention. The term "system" means a logical collection of a plurality of apparatuses and whether constituent apparatuses are located in the same body is irrelevant to this definition.

An encoder 1 is so configured as to be supplied with a series of image data to be processed $(x_0, x_1, \ldots, x_T)$. The encoder 1 receives and encodes the series of image data, that is, first data, $(x_0, x_1, \ldots, x_T)$, thereby converting it into a series of coded data, that is, second data, $(X_{F(0)}, X_{F(1)}, \ldots, X_{F(T)})$.

In the above notation, $x_t$ (t=0, 1, ..., T) represents the (t+1)th image data as counted from the head. Therefore, the index t of $x_t$ represents the temporal or spatial position of $x_t$. F(t) is function for converting t. In this example, F(t) gives a value represented by a bit sequence that is obtained by reversing the order of a bit sequence as a binary representation of t.

Therefore, the encoder 1 moves the image data $x_t$ that is located at the (t+1)th position in the series of image data to the (F(t)+1)th position in which F(t)+1 is represented by a bit sequence that is obtained by reversing the order of a bit sequence as a binary representation of t, and outputs a result as coded data.

Coded data that are output from the encoder 1 are recorded on a recording medium 2 such as an optical disc, a magneto-optical disc, a phase change disc, a magnetic tape, or a semiconductor memory, or transmitted via a transmission medium 3 such as the Internet, a CATV (cable television) network, ground waves, or a satellite channel.

On the other hand, a decoder 4 is so configured as to be supplied with a series of recorded coded data $(x_{F(0)}, x_{F(1)}, \ldots, x_{F(T)})$ that is reproduced from the recording medium 2 or provided with a series of coded data $(x_{F(0)}, x_{F(1)}, \ldots, x_{F(T)})$ that is transmitted via the transmission medium 3. The decoder 4 receives and decodes the series of coded data, that is, first data, $(x_{F(0)}, x_{F(1)}, \ldots, x_{F(T)})$, thereby converting it into a series of original image data, that is, second data, $(x_0, x_1, \ldots, x_T)$.

That is, the decoder 4 moves image data as coded data $x_{F(t)}$ that is located at the (F(t)+1)th position in the series of coded data to the (t+1)th position in which t+1 is represented by a bit sequence that is obtained by reversing the order of a bit sequence as a binary representation of F(t), and outputs a result as a decoded image.

As described above, each of the encoder 1 and the decoder 4 converts or inversely converts input data by moving information (in the above case, t or F(t)) representing the position of each data to a position represented by a bit sequence that is obtained by reversing the order of a bit sequence as a binary representation of the information.

Figure 2:
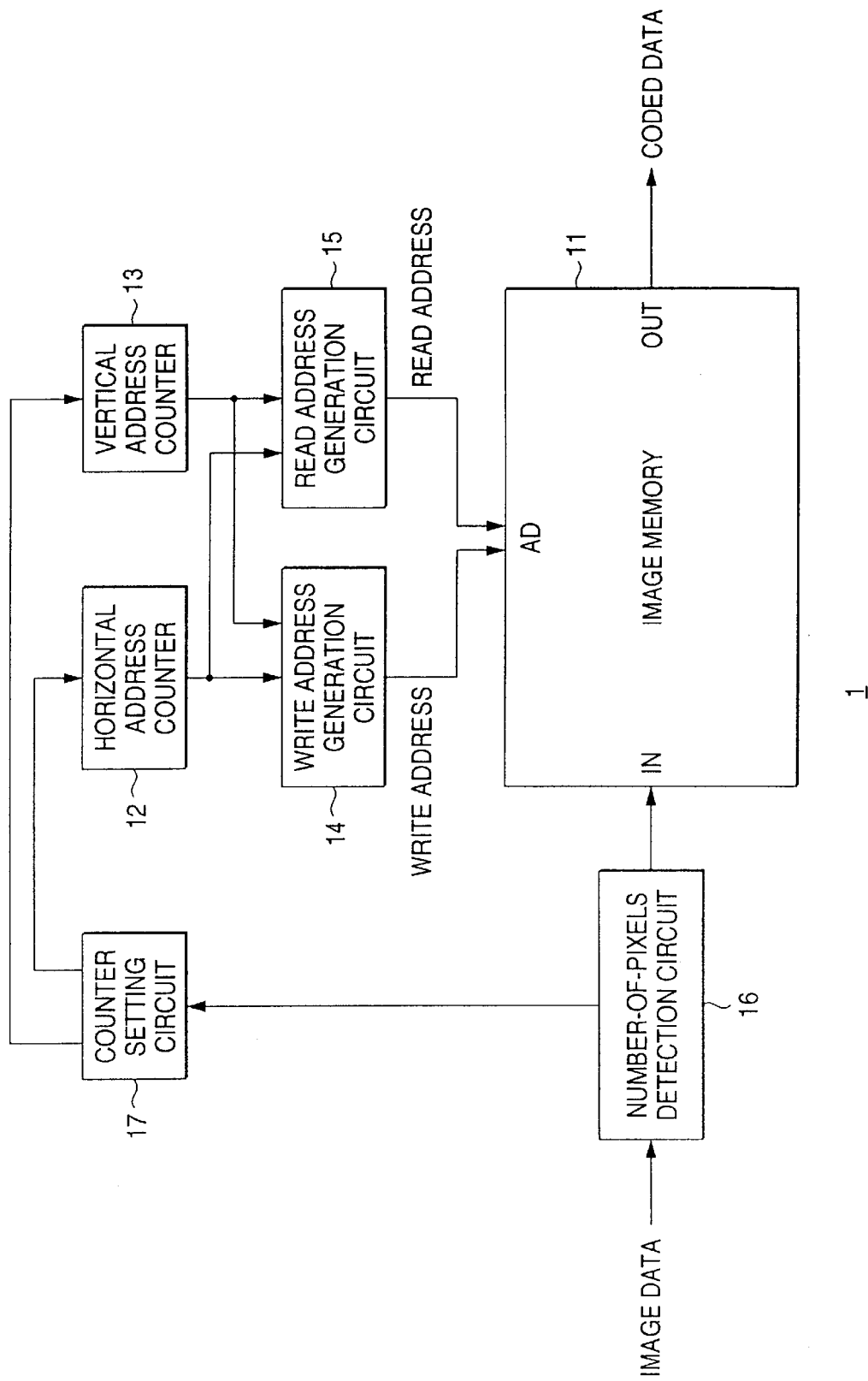
FIG. 2 is a block diagram showing an example hardware configuration of an encoder 1 shown in FIG. 1.

FIG. 2 shows an example hardware configuration of the encoder 1 shown in FIG. 1. This encoder 1 is so configured that image data are written to an image memory 11 in prescribed order and the image data thus written are converted into coded data by reading out those data in order that is different than in the writing.

Specifically, image data to be processed are input to the encoder 1 in raster scanning order on a frame-by-frame basis, for example. The image data are supplied to the input terminal IN of the image memory 11 via a number-of-pixels detection circuit 16.

Having several banks, the image memory 11 is so configured as to store image data that are input to the input terminal IN in each bank according to write addresses that are supplied to the address terminal AD. Further, the image memory 11 is so configured that image data that are stored in each bank are read out according to read addresses that are supplied to the address terminal AD and output from the output terminal OUT as coded data. The image memory 11 is a dual port memory, for example, and hence can perform data reading and writing simultaneously.

A horizontal address counter 12 is so configured as to sequentially count, for example, 0 to a value that is supplied from a counter setting circuit 17 in synchronism with image data that are supplied to the image memory 11, that is, at time points when pixels are supplied to the image memory 11, and as to supply count values to a write address generation circuit 14 and a read address generation circuit 15 as horizontal addresses representing the horizontal positions of the image data. A vertical address counter 13 is so configured as to sequentially count, for example, 0 to a value that is supplied from the counter setting circuit 17 in synchronism with a horizontal sync signal of the image data that are supplied to the image memory 11, that is, at time points when the pixels of each horizontal line are supplied to the image memory 11, and as to supply count values to the write address generation circuit 14 and the read address generation circuit 15 as vertical addresses representing the vertical positions of the image data.

The write address generation circuit 14 is so configured as to generate write addresses where the image data should be written, by using the horizontal addresses and vertical addresses themselves that are supplied from the horizontal address counter 12 and the vertical address counter 13, respectively, and as to supply the generated write addresses to the address terminal AD of the image memory 11. The read address generation circuit 15 is so configured as to generate read addresses as addresses of image data to be read out, by using a bit sequence that is obtained by reversing the order of a bit sequence as a binary representation of each horizontal address supplied from the horizontal address counter 12 and a bit sequence that is obtained by reversing the order of a bit sequence as a binary representation of each vertical address supplied from the vertical address counter 13, and as to supply the generated read addresses to the address terminal AD of the image memory 11.

The number-of-pixels detection circuit 16 is so configured as to detect the number of pixels in the horizontal direction and that in the vertical direction of, for example, one frame (i.e., one picture), and as to supply those numbers to the counter setting circuit 17. Further, the number-of-pixels detection circuit 16 supplies the received image data to the input terminal IN of the image memory 11.

The counter setting circuit 17 is so configured as to set maximum values of count values to be counted by the horizontal address counter 12 and the vertical address counter 13 in accordance with the number of pixels in the horizontal direction and that in the vertical direction of one frame that are supplied from the number-of-pixels detection circuit 16, respectively, and as to supply the thus-set maximum values to the horizontal address counter 12 and the vertical address counter 13, respectively.

Next, the operation of the encoder 1 will be described with reference to flowcharts of FIGS. 3 and 4.

First, a write process for writing image data to the image memory 11 will be described with reference to the flowchart of FIG. 3.

In the write process, image data that are input to the encoder 1 are supplied to the number-of-pixels detection circuit 16. At step S1, the number-of-pixels detection circuit 16 detects the number of pixels in the horizontal direction and that in the vertical direction of one frame from the image data thus supplied with. Now, the number of pixels in the horizontal direction and that in the vertical direction are represented by W and H, respectively. The number W of pixels in the horizontal direction and the number H of pixels in the vertical direction are supplied from the number-of-pixels detection circuit 16 to the counter setting circuit 17.

At step S2, the counter setting circuit 17 sets maximum values of count values to be counted by the horizontal address counter 12 and the vertical address counter 13 based on the number W of pixels in the horizontal direction and the number H of pixels in the vertical direction (supplied from the number-of-pixels detection circuit 16), respectively.

Specifically, the counter setting circuit 17 determines the minimum power of 2 ($2^M$) that is greater than or equal to the number W of pixels in the horizontal direction, sets a value $2^M-1$ as a maximum value of count values to be counted by the horizontal address counter 12 (hereinafter referred to as "maximum horizontal address" where appropriate), and supplies it to the horizontal address counter 12. Similarly, the counter setting circuit 17 determines the minimum power of 2 ($2^N$) that is greater than or equal to the number H of pixels in the vertical direction, sets a value $2^N-1$ as a maximum value of count values to be counted by the vertical address counter 13 (hereinafter referred to as "maximum vertical address" where appropriate), and supplies it to the vertical address counter 13.

At step S3, when receiving the maximum vertical address $2^N-1$ from the counter setting circuit 17, the vertical address counter 13 initializes variable j that represents its count value to 0 and outputs the count value 0 to the write address generation circuit 14 as a vertical address. At step S4, when receiving the maximum horizontal address $2^M-1$ from the counter setting circuit 17, the horizontal address counter 12 initializes variable i that represents its count value to 0 and outputs the count value 0 to the write address generation circuit 14.

Then, the process goes to step S5, where the write address generation circuit 14 generates a write address by adding the horizontal address i that is supplied from the horizontal address counter 12 to the vertical address j that is supplied from the vertical address counter 13, that is, generates a value in which the horizontal address i is placed after the vertical address j. Then, the process goes to step S6, where the write address generation circuit 14 supplies the write address that was generated at step S5 to the address terminal AD of the image memory 11.

On the other hand, the pixel data of a pixel that is located at the (i+1)th position from the left end and at the (j+1)th position from the top of a frame are supplied from the number-of-pixels detection circuit 16 to the input terminal IN of the image memory 11 at a time point when the write address is supplied to the address terminal AD of the image memory 11 in the above-described manner. Therefore, the image data is stored in the image memory 11 at the address corresponding to its spatial position.

Then, the process goes to step S7, where a controller or the like (not shown) judges whether the horizontal address i of the horizontal address counter 12 is equal to the maximum horizontal address $2^m-1$. If it is judged that the horizontal address i is not equal to the maximum horizontal address $2^M-1$, the process goes to step S8, where the horizontal address counter 12 increments the horizontal address i by 1. Then, the process returns to step S5 and operations similar to the above are repeated. In this manner, the pixel data of pixels constituting a certain horizontal line are sequentially stored in the image memory 11 at addresses corresponding to their spatial positions.

On the other hand, if it is judged at step S7 that the horizontal address i is equal to the maximum horizontal address $2^M-1$, the process goes to step S9, where the controller or the like judges whether the vertical address j of the vertical address counter 13 is equal to the maximum vertical address $2^N-1$. If it is judged at step S9 that the vertical address j is not equal to the maximum vertical address $2^N-1$, the process goes to step S10, where the vertical address counter 13 increments the vertical address j by 1. Then, the process returns to step S4 and operations similar to the above are repeated.

If it is judged at step S9 that the vertical address j is equal to the maximum vertical address $2^N-1$, the process goes to step S11, where the controller or the like (not shown) judges whether all frames to be processed have been written to the image memory 11. If the controller or the like judges at step S11 that not all frames to be processed have been written to the image memory 11, the process returns to step S3 and operations similar to the above are repeated for the next frame.

On the other hand, if it is judged at step S11 that all frames to be processed have been written to the image memory 11, the write process is finished.

In the write process, as described above, the horizontal address i is counted from 0 to the maximum horizontal address $2^M-1$ and the vertical address j is counted from 0 to the maximum vertical address $2^N-1$. Since $2^M$ and $2_N$ are the minimum powers of 2 that are greater than or equal to the number W of pixels in the horizontal direction and the number H of pixels in the vertical direction of a frame, respectively, if the number W of pixels in the horizontal direction of a frame is not equal to a power of 2, extra data of $2^M-W$ pixels are stored in the horizontal direction, that is, on the right of the true image, in the image memory 11. Similarly, if the number H of pixels in the vertical direction of a frame is not equal to a power of 2, extra data of $2^N-H$ pixels are stored in the vertical direction, that is, under the true image, in the image memory 11. Those extra data will be hereinafter referred to as "dummy data" where appropriate. Dummy data are controlled by the controller or the like to so as to be supplied from the number-of-pixels detection circuit 16 to the input terminal IN of the image memory 11 at time points when they are needed.

Therefore, in the write process, basically, image data of each frame are stored in the image memory 11 at addresses corresponding to the positions of the respective pixels. However, if the number W of pixels in the horizontal direction or the number H of pixels in the vertical direction of a frame is not equal to a power of 2, dummy data are additionally stored on the right of or under the frame so that the number of pixels coincides with a power of 2.

Next, a read process for reading out image data that are written to the image memory 11 will be described with reference to the flowchart of FIG. 4. The read process is started, for example, when a one-frame image has been written to the image memory 1, and is thereafter executed parallel with the write process that has been described above with reference to FIG. 3 by bank switching.

Specifically, in the read process, first, at step S21, the vertical address counter 13 initializes variable j that represents its count value to 0 and outputs the count value 0 to the read address generation circuit 15 as a vertical address. At step S22, the horizontal address counter 12 initializes variable i that represents its count value to 0 and outputs the count value 0 to the read address generation circuit 15.

Then, the process goes to step S23, where the read address generation circuit 15 reverses the order of a bit sequence as a binary representation of the horizontal address i that is supplied from the horizontal address counter 12 and employs, as a new horizontal address, a value i' that is represented by a resulting bit sequence. Still at step S23, the read address generation circuit 15 reverses the order of a bit sequence as a binary representation of the vertical address j that is supplied from the vertical address counter 13 and employs, as a new vertical address, a value j' that is represented by a resulting bit sequence. Then, the process goes to step S24, where the read address generation circuit 15 generates a read address by adding the new horizontal address i' to the new vertical address j'. Then, the process goes to step S25, where the read address generation circuit 15 supplies the read address that was generated at step S24 to the address terminal AD of the image memory 11.

In this manner, the image data of a pixel that is located at the (i'+1)th position from the left end and at the (j'+1)th position from the top in the original image (or an image to which dummy data are added if the dummy data were added) are read out from the image memory 11 and output as coded data. That is, image data of the pixel that is located at the (i'+1)th position from the left end and at the (j'+1)th position from the top in the original image replace image data of a pixel that is located at the (i+1)th position from the left end and at the (j+1)th position from the top and is output as coded data.

Then, the process goes to step S26, where the controller or the like (not shown) judges whether the horizontal address i of the horizontal address counter 12 is equal to the maximum horizontal address $2^M-1$. If it is judged that the horizontal address i is riot equal to the maximum horizontal address $2^M-1$, the process goes to step S27, where the horizontal address counter increments the horizontal address i by 1. Then, the process returns to step S23 and operations similar to the above are repeated.

On the other hand, if the controller or the like judges at step S26 that the horizontal address i is equal to the maximum horizontal address $2^M-1$, the process goes to step S28, where the controller or the like judges whether the vertical address j of the vertical address counter 13 is equal to the maximum vertical address $2^N-1$. If it is judged at step S28 that the vertical address j is not equal to the maximum vertical address $2^N-1$, the process goes to step S29, where the vertical address counter 13 increments the vertical address j by 1. Then, the process returns to step S22 and operations similar to the above are repeated.

Figure 3:
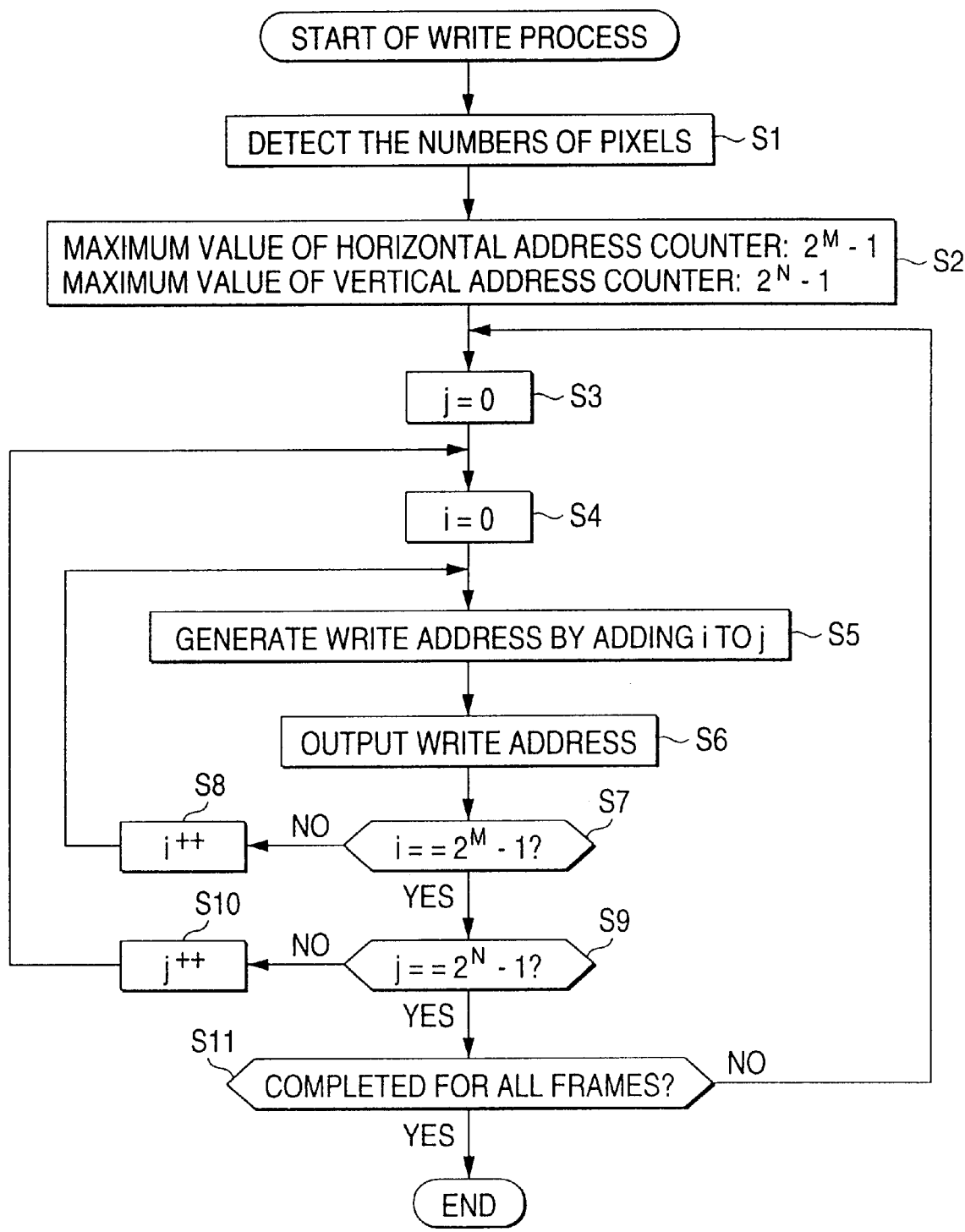
FIG. 3 is a flowchart showing a write process of the encoder 1 of FIG. 2.
Figure 4:
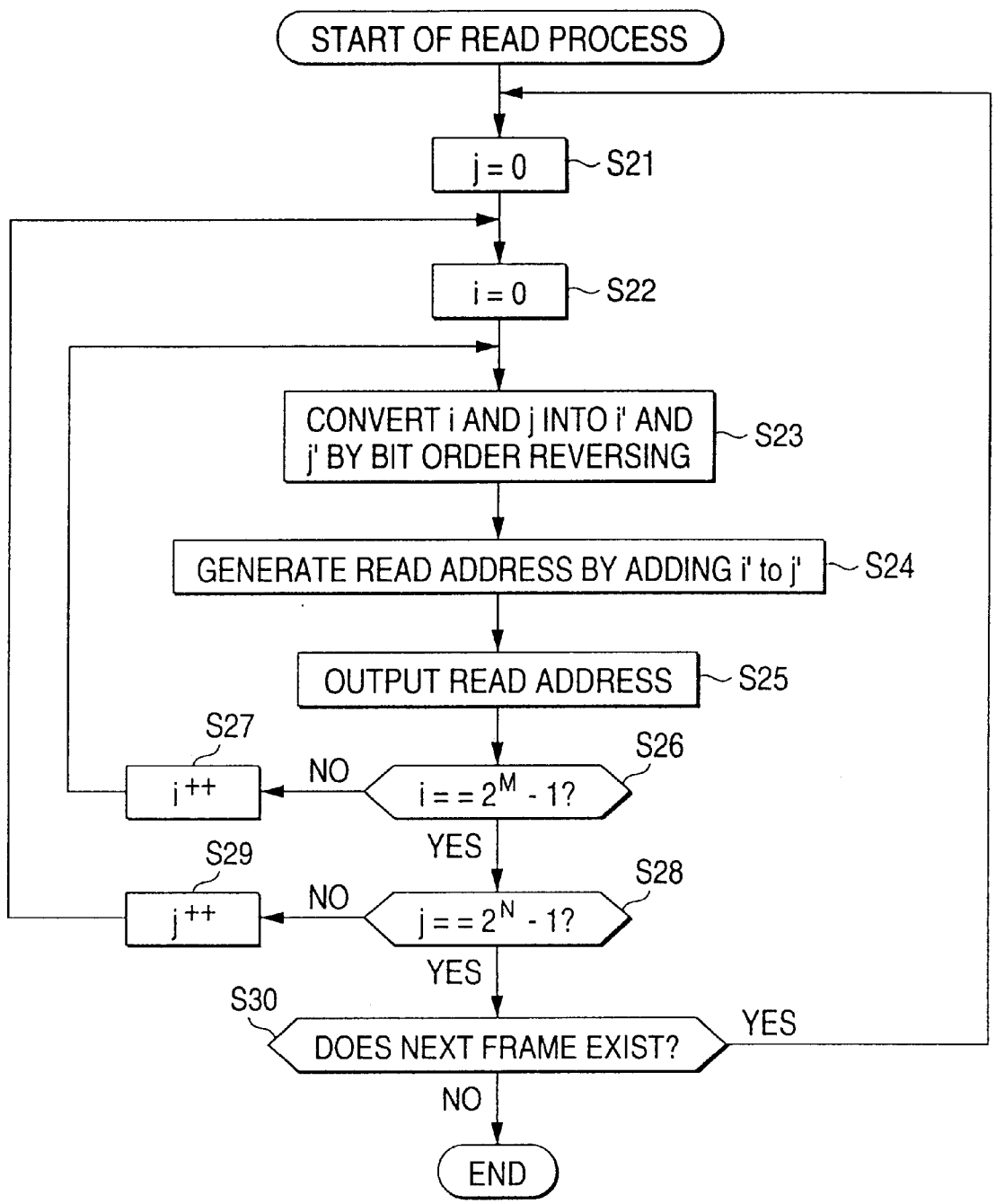
FIG. 4 is a flowchart showing a read process of the encoder 1 of FIG. 2.

The maximum horizontal address $2^M-1$ and the maximum vertical address $2^N-1$ are determined before the writing is started (steps S1 and S2 shown in FIG. 3). Therefore, those addresses that were determined in the write process are used in the read process as they are.

If the controller or the like (not shown) judges at step S28 that the vertical address j is equal to the maximum vertical address $2^N-1$, the process goes to step S30, where the controller or the like judges whether image data have not been read out yet in the image memory 11. If it is judged at step S30 that image data have not been read out yet in the image memory 11, the process returns to step S21, where operations similar to the above are repeated for the stored image data, that is, a frame that has not been read out yet.

On the other hand, if it is judged at step 30 that no image data have not been read out yet in the image memory 11, that is, if there are no image data that have not been read out from the image memory 11 yet, the read process is finished.

As described above, in the read process, the order of a bit sequence as a binary representation of a horizontal address i is reversed and a value i' that is represented by a resulting bit sequence is made a new horizontal address. Further, in the read process, the order of a bit sequence as a binary representation of a vertical address j is reversed and a value j' that is represented by a resulting bit sequence is made a new vertical address. A read address is generated by adding the new horizontal address i' to the new vertical address j'. Therefore, by reading out image data from the image memory 11 according to such read addresses, image data that are localized spatially are distributed spatially and resulting spatially distributed image data are output as coded data.

Figure 5:
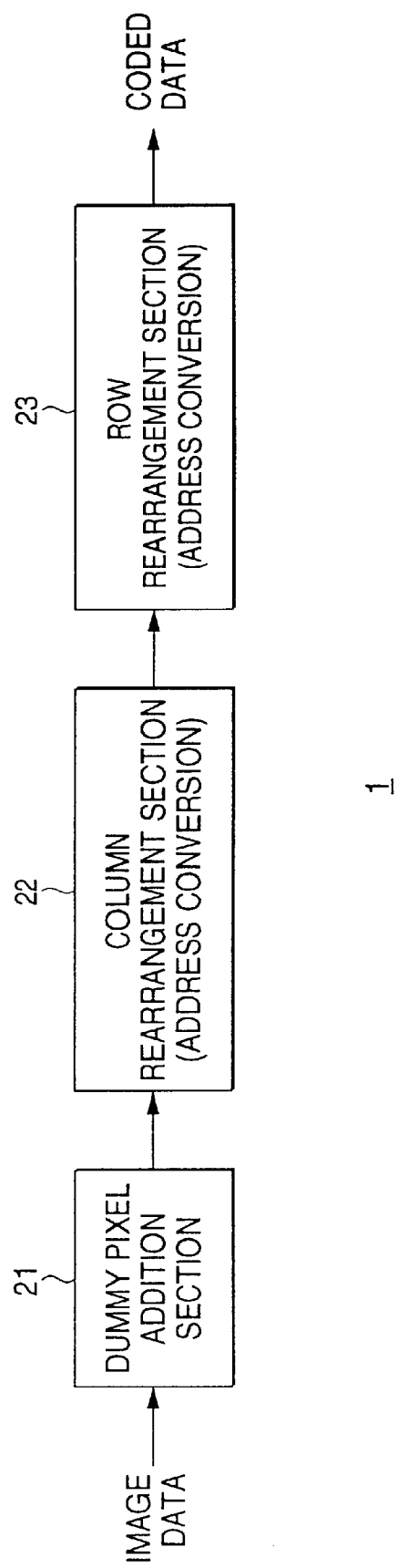
FIG. 5 is a first functional block diagram of the encoder 1 shown in FIG. 1.

FIG. 5 shows an example functional configuration of the encoder 1 of FIG. 1.

Image data, that is, first data, to be processed are supplied, for example, on a frame-by-frame basis, to a dummy pixel addition section 21, where dummy data are added to the image data. Specifically, the dummy pixel addition section 21 detects the number W of pixels in the horizontal direction and the number H of pixels in the vertical direction of one frame. If the number W of pixels in the horizontal direction is not equal to a power of 2, the dummy pixel addition section 21 adds dummy data to the image data in the horizontal direction by a difference between the number W of pixels and the minimum power of 2 ($2^M$) that is greater than W. If the number H of pixels in the vertical direction is not equal to a power of 2 ($2^N$), the dummy pixel addition section 21 adds dummy data to the image data in the vertical direction by a difference between the number H of pixels and the minimum power of 2 that is greater than H. The image data of W (horizontal)×H (vertical) pixels are converted in this manner into image data in which both of the number of pixels in the horizontal direction and that in the vertical direction are equal to a power of 2, that is image data of $2^M \times 2^N$ pixels, which are supplied to a column rearrangement section 22.

For example, now assume that image data in which one frame (or one picture) consists of 8 (horizontal)×6 (vertical) pixels as shown in FIG. 6A have been supplied to the dummy pixel addition section 21. Since the number 8 of pixels in the horizontal direction of the image data supplied to the dummy pixel addition section 21 is equal to a power of 2 (in this case, $2^3$), the dummy pixel addition section 21 adds no dummy data in the horizontal direction and leaves the image data as they are in the horizontal direction. On the other hand, the number 6 of pixels in the vertical direction is not equal to a power of 2. Since the minimum power of 2 that is greater than the number 6 of pixels in the vertical direction is 8 (=$2^3$), the dummy pixel addition section 21 adds dummy data of 2 (the difference from 8) pixels in the vertical direction. Therefore, in this case, the dummy pixel addition section 21 adds dummy data of 2 pixels (shaded in FIG. 6B) in the vertical direction as shown in FIG. 6B, whereby image data of one picture having 8×8 pixels are constructed.

In FIGS. 6A and 6B, x and y in (x, y) represent the horizontal address and the vertical address, respectively, of a pixel of an original image (this also applies to FIGS. 7A–7B and 22A and 22B (described later)). The horizontal address and the vertical address of a pixel represent the positions in the horizontal and vertical directions in the picture (or frame). That is, the values of the horizontal address plus 1 and the vertical address plus 1 represent the positions of the pixel from the left end and the top of the picture, respectively.

If both of the number W of pixels in the horizontal direction and the number H of pixels in the vertical direction of input image data are equal to a power of 2, the dummy pixel addition section 11 outputs the image data themselves to the column rearrangement section 22.

The column rearrangement section 22 rearranges the columns, that is, the groups of pixels arranged in the vertical direction, of the image data that are supplied from the dummy pixel addition section 21. Specifically, the column rearrangement section 22 moves image data of a certain column among the image data of $2^M \times 2^N$ pixels to a position having, as a horizontal address, a bit sequence that is obtained by reversing the order of a bit sequence as a binary representation of the horizontal address that represents the position of the column concerned.

For example, if the image data of 8×8 pixels shown in FIG. 6B are output from the dummy pixel addition section 21, the following bit sequences are obtained by reversing the order of each of bit sequences as binary representations of horizontal addresses 0 to 7 of the image data.

$$0(000B) \rightarrow 0(000B)$$
$$1(001B) \rightarrow 4(100B)$$
$$2(010B) \rightarrow 2(010B)$$
$$3(011B) \rightarrow 6(110B)$$
$$4(100B) \rightarrow 1(001B)$$
$$5(101B) \rightarrow 5(101B)$$
$$6(110B) \rightarrow 3(011B)$$
$$7(111B) \rightarrow 7(111B) \quad (1)$$

where character B indicates that the preceding number is a binary number.

Therefore, in the column rearrangement section 22, the image data that are located at the columns corresponding to the horizontal addresses 0 to 7 of the image data of 8×8 pixels shown in FIG. 6B are moved to the columns corresponding to the horizontal addresses 0, 4, 2, 6, 1, 5, 3, and 7, respectively, whereby image data shown in FIG. 7A are obtained.

The image data produced by the above column rearrangement in the column rearrangement section 22 are supplied to a row rearrangement section 23.

The row rearrangement section 23 rearranges the rows, that is, the groups of pixels arranged in the horizontal direction, of the image data that are supplied from the column rearrangement section 22. Specifically, the row rearrangement section 23 moves image data of a certain row among the image data of $2^M \times 2^N$ pixels to a position having, as a vertical address, a bit sequence that is obtained by reversing the order of a bit sequence as a binary representation of the vertical address that represents the position of the row concerned.

For example, if the image data of 8×8 pixels shown in FIG. 7A are output from the column rearrangement section 22, the same bit sequences as the above bit sequences (1) are obtained by reversing the order of each of bit sequences as binary representations of vertical addresses 0 to 7 of the image data.

Therefore, in the row rearrangement section 23, as in the case of the column rearrangement section 22, the image data that are located at the rows corresponding to the vertical addresses 0 to 7 of the image data of 8×8 pixels shown in FIG. 7A are moved to the rows corresponding to the vertical addresses 0, 4, 2, 6, 1, 5, 3, and 7, respectively, whereby image data shown in FIG. 7B are obtained.

The image data produced by the above row rearrangement in the row rearrangement section 23 are output as coded data.

By comparing the image data shown in FIG. 6B before being subjected to the rearrangement of the row and column positions and the image data shown in FIG. 7B after being subjected to the rearrangement of the row and column positions, it is seen that the image data of the respective pixels have been distributed, so to speak, uniformly.

Figure 8:
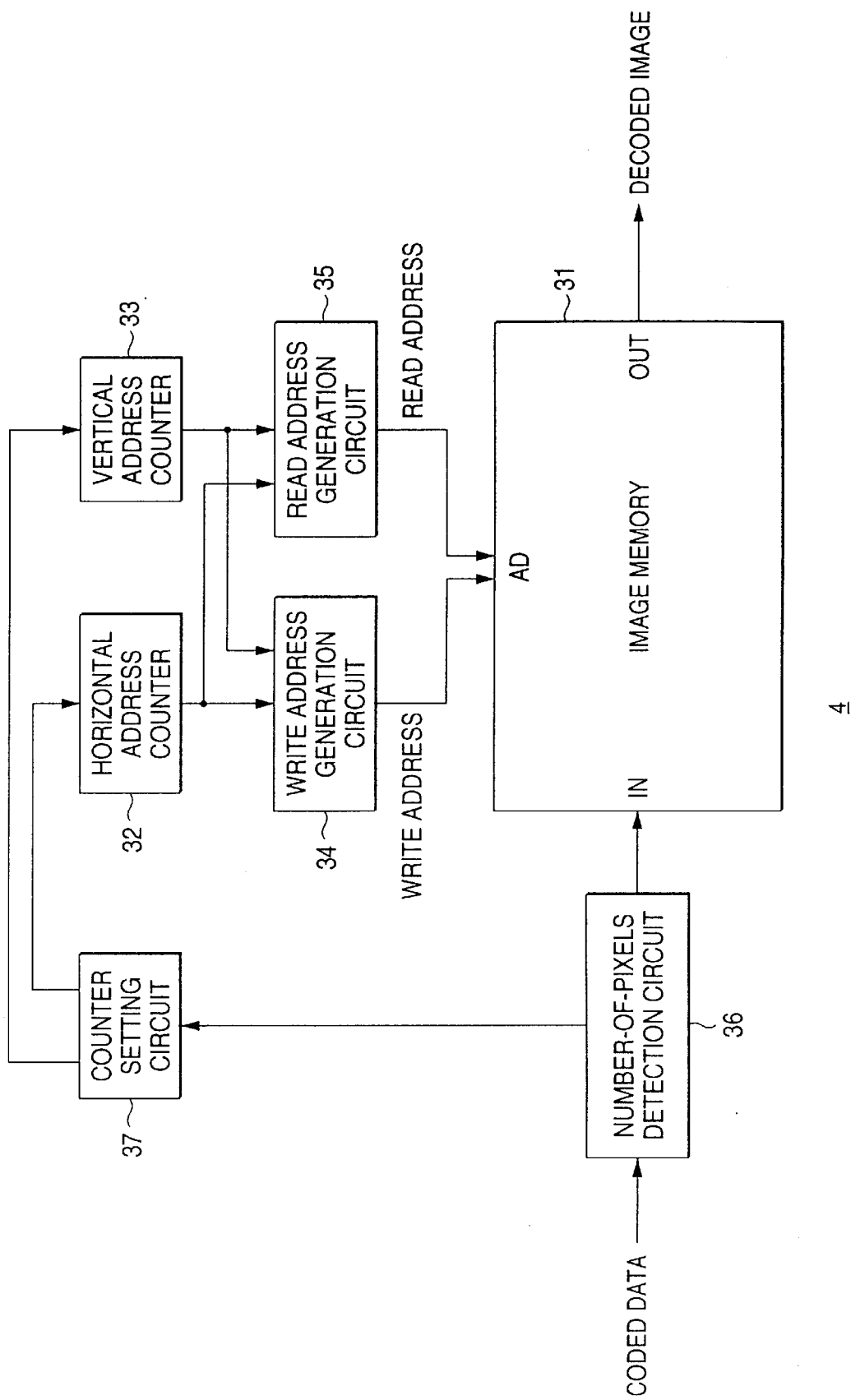
FIG. 8 is a block diagram showing an example hardware configuration of a decoder 4 shown in FIG. 1.

FIG. 8 shows an example hardware configuration of the decoder 4 shown in FIG. 1.

The decoder 4 is so configured that coded data are input thereto in raster scanning order on a frame-by-frame basis, for example, and that the coded data are supplied to the input terminal IN of an image memory 31 via a number-of-pixels detection circuit 36.

The image memory 31, a horizontal address counter 32, a vertical address counter 33, a write address generation circuit 34, a read address generation circuit 35, the number-of-pixels detection circuit 36, and a counter setting circuit 37 that constitute the decoder 4 are configured in the same manner as the image memory 11, the horizontal address counter 12, the vertical address counter 13, the write address generation circuit 14, the read address generation circuit 15, the number-of-pixels detection circuit 16, and the counter setting circuit 17 that constitute the encoder 1 of FIG. 2, respectively. Therefore, the decoder 4 executes basically the same process as the encoder 1 on the coded data and thereby restores original image data.

That is, the decoder 4 is so configured as to restore the original image data by writing coded data in the image memory 31 and reading out the coded data thus written in the same manner as the encoder 1.

Figure 9:
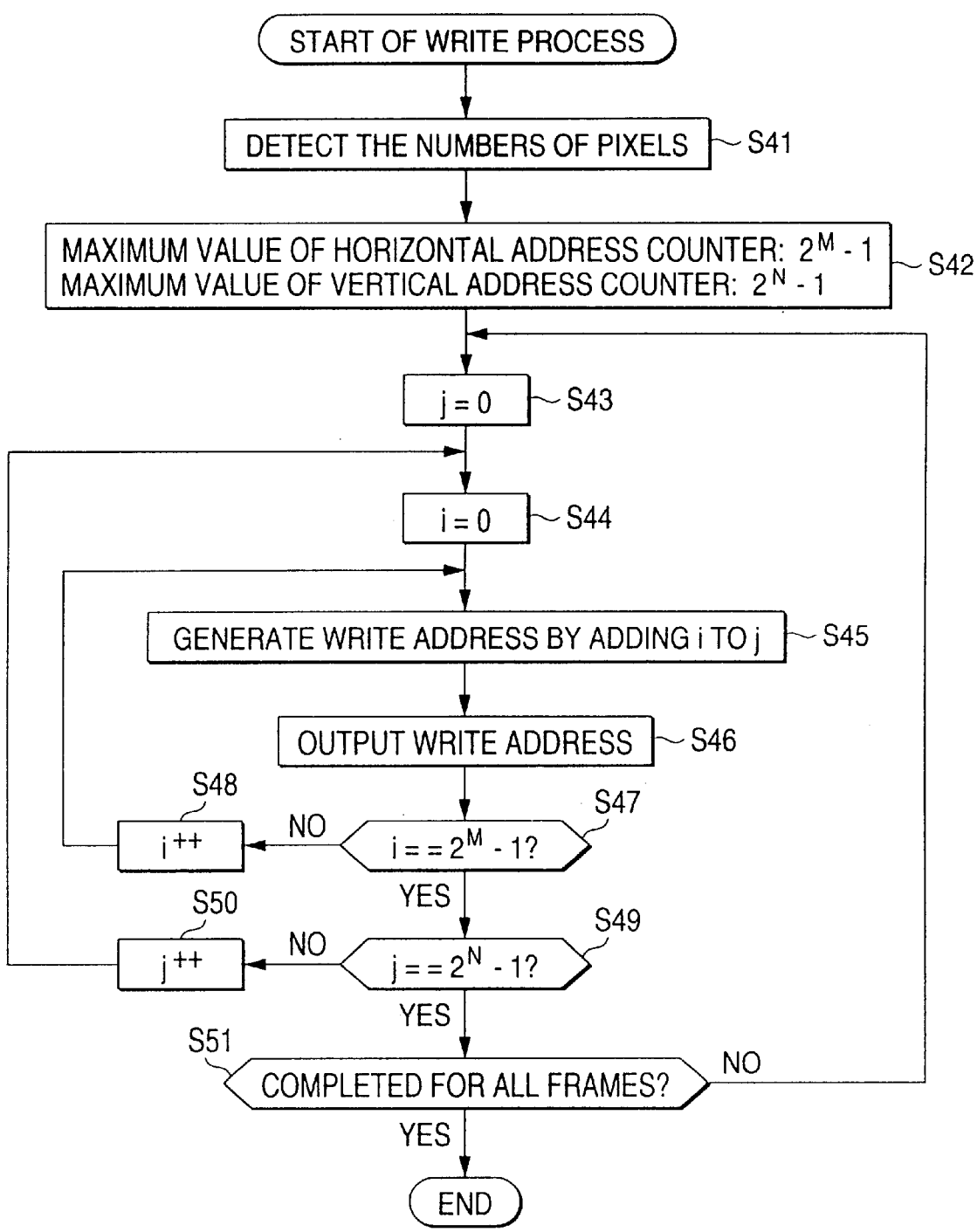
FIG. 9 is a flowchart showing a write process of the decoder 4 of FIG. 8.
Figure 10:
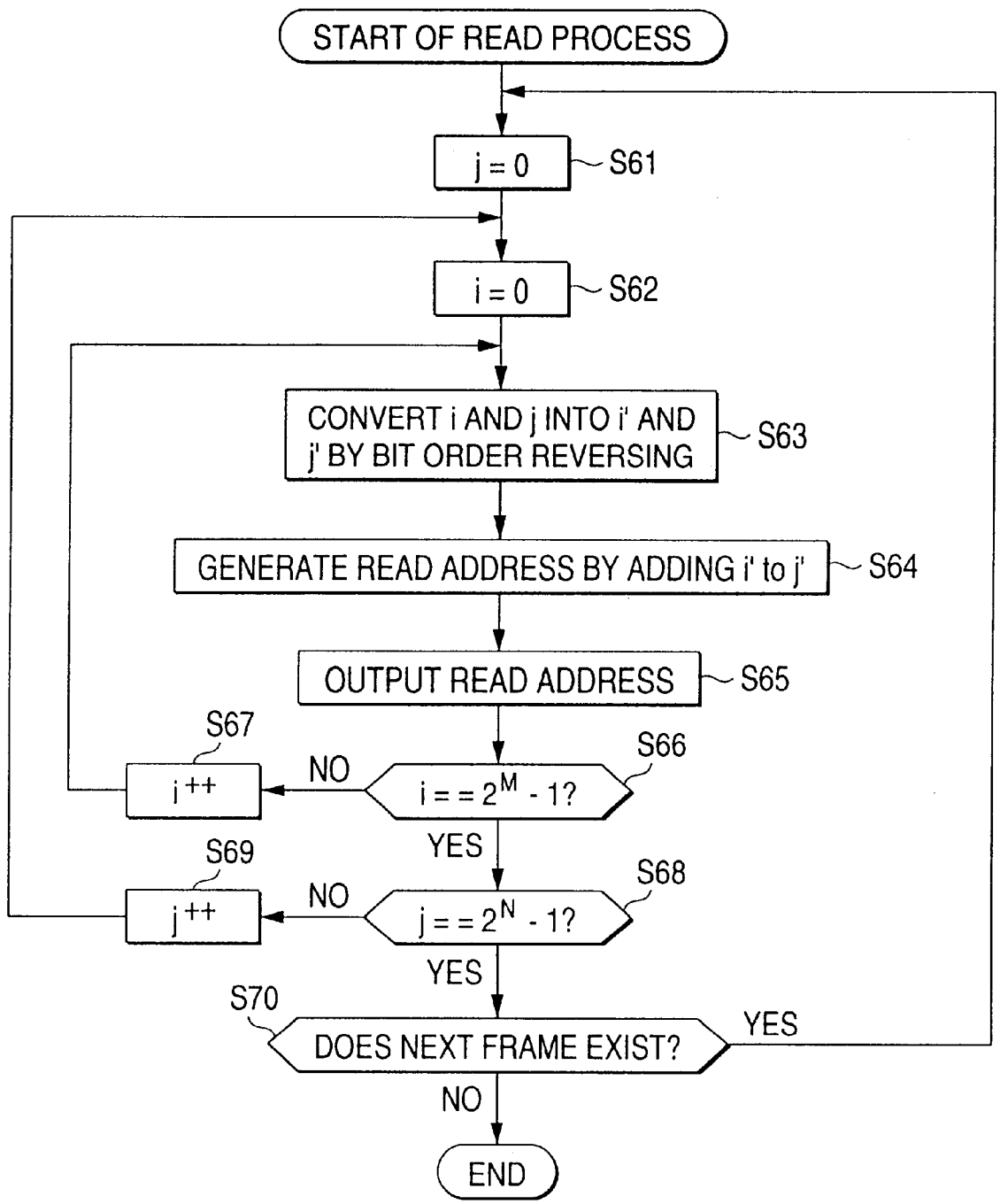
FIG. 10 is a flowchart showing a read process of the decoder 4 of FIG. 8.

Specifically, coded data are decoded into the original image data by executing a write process and a read process shown in the flowcharts of FIGS. 9 and 10, respectively.

Steps S41–S51 (FIG. 9) that constitute the write process of the decoder 4 are similar to steps S1–S11 (see FIG. 3) that constitute the write process of the encoder 1, respectively, and hence are not described here. Steps S61S70 (FIG. 10) that constitute the read process of the decoder 4 are similar to steps S21–S30 (see FIG. 4) that constitute the read process of the encoder 1, respectively, and are not described here.

At step S2 shown in FIG. 3, if the number of pixels in the horizontal or vertical direction of image data as a processing object is not equal to a power of 2 in the counter setting circuit 17, the minimum power of 2, that is, $2^M$ or $2^N$, that is greater than the number of pixels in the horizontal or vertical direction is determined and $2^M-1$ or $2^N-1$ is set as a maximum horizontal or vertical address. In contrast, both of the number of pixels in the horizontal direction and that in the vertical direction of coded data supplied to the decoder 4 are equal to a power of 2 because of addition of dummy data in the encoder 1. Therefore, at step S42 in FIG. 9 that corresponds to step S2 in FIG. 3, the counter setting circuit 37 sets a maximum horizontal address and a maximum vertical address by using the number of pixels in the horizontal direction and that in the vertical direction of coded data as they are. Since the number of pixels in the horizontal direction and that in the vertical direction of coded data are necessarily equal to a power of 2, at this step it is not necessary to determine the minimum powers of 2 that are greater than the number of pixels in the horizontal direction and that in the vertical direction.

In the above manner, in the write process of the decoder 4, coded data of each frame are stored in the image memory 31 at addresses corresponding to the positions of the respective pixels. Then, in the read process, the order of a bit sequence as a binary representation of a horizontal address i is reversed and a value i' that is represented by a resulting bit sequence is made a new horizontal address. Further, in the read process, the order of a bit sequence as a binary representation of a vertical address j is reversed and a value j' that is represented by a resulting bit sequence is made a new vertical address. A read address is generated by adding the new horizontal address i' to the new vertical address j'. Therefore, the coded data as image data that are distributed spatially are restored to the original image data having spatially localized data.

FIG. 11 shows an example functional configuration of the decoder 4 shown in FIG. 1.

Coded data, that is, first data, are supplied to and received by a row rearrangement section 41 on a frame-by-frame basis, for example. The row rearrangement section 41 rearranges the rows, that is, the groups of pixels arranged in the horizontal direction, of the coded data (image data) in the same manner as the row rearrangement section 23 shown in FIG. 5 does. Specifically, the row rearrangement section 41 moves image data of a certain row among the image data of $2^M \times 2^N$ pixels to a position having, as a vertical address, a bit sequence that is obtained by reversing the order of a bit sequence as a binary representation of the vertical address that represents the position of the row concerned.

For example, if the coded data of 8×8 pixels shown in FIG. 7B are input to the row rearrangement section 41, the same bit sequences as the above-described bit sequences (1) are obtained by reversing the order of each of bit sequences as binary representations of vertical addresses 0 to 7 of the coded data. Therefore, in the row rearrangement section 41, the image data that are located at the rows corresponding to the vertical addresses 0 to 7 of the coded data of 8×8 pixels shown in FIG. 7B are moved to the rows corresponding to the vertical addresses 0, 4, 2, 6, 1, 5, 3, and 7, respectively, whereby coded data shown in FIG. 7A are obtained.

The coded data produced by the above row rearrangement in the row rearrangement section 41 are supplied to the column rearrangement section 42.

The column rearrangement section 42 rearranges the columns, that is, the groups of pixels arranged in the vertical direction, of the coded data that are supplied from the row rearrangement section 41. Specifically, the column rearrangement section 42 moves coded data of a certain column among the image data of $2^M \times 2^N$ pixels to a position having, as a horizontal address, a bit sequence that is obtained by reversing the order of a bit sequence as a binary representation of the horizontal address that represents the position of the column concerned.

For example, if the coded data of 8×8 pixels shown in FIG. 7A are output from the row rearrangement section 41, the same bit sequences as the above-described bit sequences (1) are obtained by reversing the order of each of bit sequences as binary representations of horizontal addresses 0 to 7 of the coded data.

Therefore, in the column rearrangement section 42, as in the case of the row rearrangement section 41, the image data that are located at the columns corresponding to the horizontal addresses 0 to 7 of the coded data of 8×8 pixels shown in FIG. 7A are moved to the columns corresponding to the horizontal addresses 0, 4, 2, 6, 1, 5, 3, and 7, respectively, whereby coded data shown in FIG. 6B are obtained.

The coded data produced by the above row rearrangement in the column rearrangement section 42 are supplied to a dummy pixel deletion section 43.

The dummy data are deleted from the coded data that are supplied from the column rearrangement section 42 in the dummy pixel deletion section 43, whereby the original image data are restored and output.

Specifically, as described above with reference to FIG. 5, if the number W of pixels in the horizontal direction of one frame is not equal to a power of 2, the dummy pixel addition section 21 adds dummy data to the image data in the horizontal direction by a difference between the number W of pixels and the minimum power of 2 ($2^M$) that is greater than W. Similarly, if the number H of pixels in the vertical direction is not equal to a power of 2, the dummy pixel addition section 21 adds dummy data to the image data in the vertical direction by a difference between the number H of pixels and the minimum power of 2 ($2^N$) that is greater than H. The dummy pixel deletion section 43 deletes the dummy data that were added in the above manner and produces image data having the original number of pixels.

For example, now assume that image data as coded data of 8×8 pixels shown in FIG. 6B to which dummy data of two pixels are added in the vertical direction are supplied from the column rearrangement section 42 to the dummy pixel deletion section 43. The dummy pixel deletion section 43 detects and deletes the dummy data of two rows that are added to the coded data, whereby the original image data of 8 (horizontal)×6 (vertical) pixels shown in FIG. 6A are restored.

If both of the number W of pixels in the horizontal direction and the number H of pixels in the vertical direction of the coded data are equal to a power of 2, the dummy pixel deletion section 43 outputs the coded data themselves as a decoding result.

For example, the dummy data detection is enabled by using, as dummy data, a value that original image data cannot have, which may be a pixel value such as 0 or 255 that scarcely exists in natural images.

As described above, in the encoder 1, coded data are produced by moving the position of image data, that is, first data, to a position corresponding to a horizontal or vertical address that is represented by a bit sequence that is obtained by reverting the order of a bit sequence as a binary representation of the horizontal or vertical address representing the position of the image data. Therefore, coded data, that is, second data, can be obtained in which the image data of the respective pixels are distributed, so to speak, uniformly.

In the decoder 4, as in the case of the encoder 1, the position of coded data, that is, first data, is moved to a position corresponding to a horizontal or vertical address that is represented by a bit sequence that is obtained by reverting the order of a bit sequence as a binary representation of the horizontal or vertical address representing the position of the coded data. Therefore, uniformly distributed image data can be restored to the original image data, that is, second data, (in which image data are concentrated in a local region).

Figure 12A:
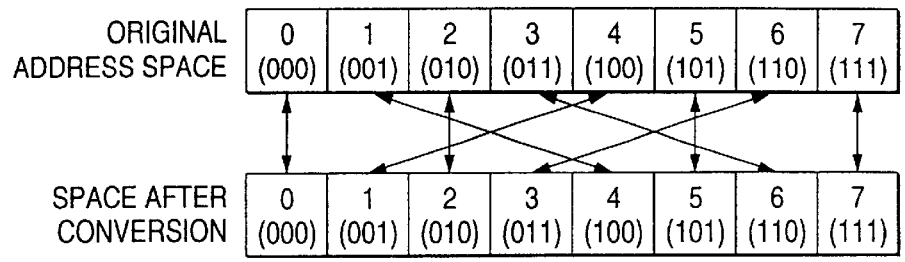
FIG. 12A is a first chart showing the properties of bit order reversing.

For example, where 3-bit address spaces are employed to represent horizontal addresses and vertical addresses, an address space before rearrangement of horizontal addresses and vertical addresses (hereinafter referred to as "original address space" where appropriate) is in one-to-one correspondence with an address space after the rearrangement (hereinafter referred to as "converted address space" where appropriate) as shown in FIG. 12A and the two address spaces have a relationship that the converted address space is obtained by reversing the order of a bit sequence as a binary representation of each address in the original address space, and vice versa, as is understood from the above description using the bit sequences (1). Further, the relationship between the two address spaces is uniquely determined if the size of those address spaces, that is, the number of bits by which each address is expressed, is uniquely determined. Therefore, if the encoder 1 and the decoder 4 recognize only the rule that each address is converted into an address represented by a bit sequence that is obtained by reversing the order of a bit sequence of the former address, the manner of conversion is uniquely determined by the size of an address space of conversion object data. As a result, conversion and inverse conversion for distributing localized data and concentrating the thus-distributed data so that they are located at the original positions can be performed without the need for using information of a random sequence, a seed, or the like as in the case of, for example, data conversion using random numbers.

Where each address is converted into an address represented by a bit sequence that is obtained by reversing the order of a bit sequence of the former address, to uniquely determine the manner of conversion, that is, the corresponding relationship between an original address and a converted address, it is necessary that the number of addresses be equal to a power of 2. To this end, as described above, when the number of pixels in the horizontal or vertical direction is not equal to a power of 2, the encoder 1 adds dummy data to equalize the number of pixels in the horizontal or vertical direction to a power of 2.

The fact that image data can be distributed uniformly and distributed data can be concentrated by converting each address into an address represented by a bit sequence that is obtained by reversing the order of a bit sequence of the former address (hereinafter referred to as "bit order reversing" where appropriate) is due to the following properties of the bit order reversing.

Figure 12B:
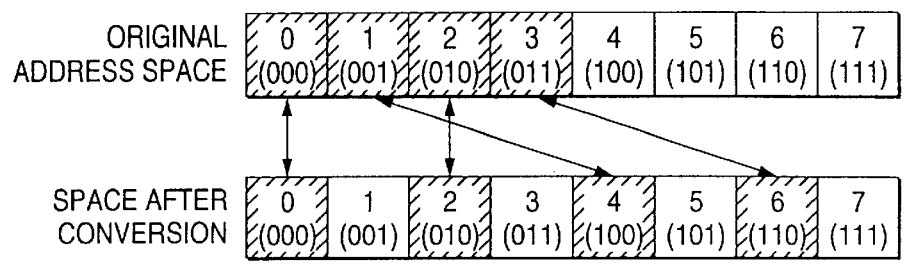
FIG. 12B is a second chart showing the properties of the bit order reversing.
Figure 12C:
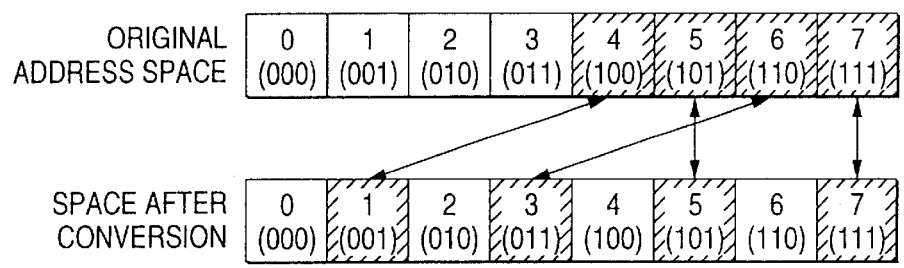
FIG. 12C is a third chart showing the properties of the bit order reversing.
Figure 12D:
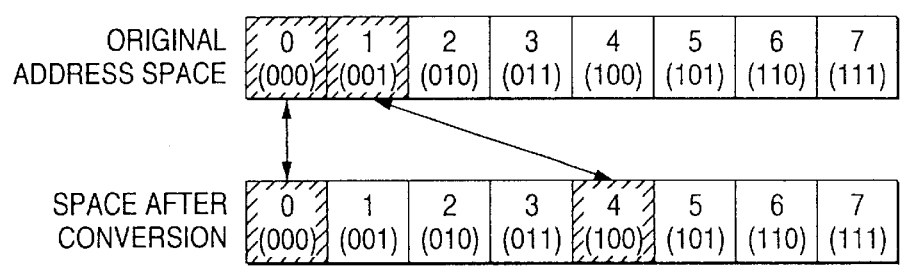
FIG. 12D is a fourth chart showing the properties of the bit order reversing.
Figure 12E:
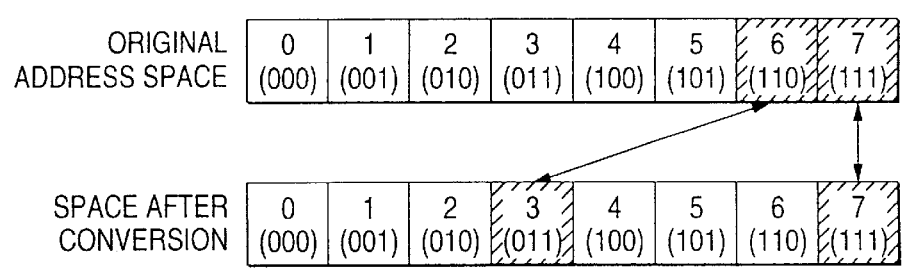
FIG. 12E is a fifth chart showing the properties of the bit order reversing.

That is, according to the bit order reversing, addresses that are adjacent to each other in an original address space are converted into addresses that are most distributed in a converted address space. For example, as for bit order reversing of a 3-bit address space shown in FIG. 12A, as shown in FIGS. 12B and 12C, addresses 0 to 3 that are adjacent to each other in an original address space are distributed to become addresses 0, 2, 4, and 6, respectively, in a converted address space and addresses 4 to 7 that are adjacent to each other in the original address space are distributed to become addresses 1, 3, 5, and 7, respectively, in the converted address space. Further, for example, as shown in FIGS. 12D and 12E, address 0 and 1 that are adjacent to each other in the original address space are distributed to become addresses 0 and 6, respectively, in the converted address space and addresses 6 and 7 that are adjacent to each other in the original address space are distributed to become addresses 3 and 7, respectively, in the converted address space. This means that the bit order reversing causes addresses that are distributed in an original address space to become addresses that are adjacent to each other in a converted address space.

It is understood from the above properties that the encoder 1 distributes image data that are localized spatially through the bit order reversing and, similarly, the decoder 4 distributes coded data that are localized spatially through the bit order reversing. Therefore, for example, when an error or noise has occurred in a spatially localized portion of coded data received by the decoder 4, the spatially localized error or noise is distributed by the bit order reversing. As a result, the error or noise can be made inconspicuous in a decoded image.

Although the encoder 1 of FIG. 5 performs column rearrangement first and then performs row rearrangement, a reverse procedure may be employed in which row rearrangement is performed first and then column rearrangement is performed. This also applies to the decoder 4 of FIG. 11. Further, the order of column rearrangement and row rearrangement in the encoder 1 of FIG. 5 and that in the decoder 4 of FIG. 11 do not depend on each other. That is, the order of column rearrangement and row rearrangement in the encoder 1 of FIG. 5 can be determined irrespective of that in the decoder 4 of FIG. 11, and the order of column rearrangement and row rearrangement in the decoder 4 of FIG. 11 can be determined irrespective of that in the encoder 1 of FIG. 5.

The above discussion leads to the following conclusion. In the encoder 1 described above with reference to FIGS. 2–4, image data are written to positions corresponding to their horizontal addresses and vertical addresses in writing those to the image memory 11 and image data at positions corresponding to horizontal addresses and vertical addresses that are obtained by performing bit order reversing on their original horizontal addresses and vertical addresses, that is, horizontal addresses and vertical addresses that are output from the horizontal address counter 12 and the vertical address counter 13, respectively, are read out in reading those from the image memory 11. A reverse procedure may be employed in which image data are written to positions corresponding to horizontal addresses and vertical addresses that are obtained by performing bit order reversing on their horizontal addresses and vertical addresses in writing those to the image memory 11 and image data at positions corresponding to their original horizontal addresses and vertical addresses are read out in reading those from the image memory 11. This also applies to the decoder 4 that was described above with reference to FIGS. 8–10.

Since the encoder 1 can produce coded data in which the original image data are distributed uniformly, the decoder 4 can obtain an outline of the original image data if only part of the coded data exist, that is, even if not all of the coded data exist.

For example, if the encoder 1 performs bit order reversing on each of the columns and the rows of image data shown in FIG. 13A, coded data shown in FIG. 13B can be obtained in which image data are distributed spatially in a uniform manner. For example, if the decoder 4 cuts out the top-left ¼ portion of the coded data as shown in FIG. 13C and performs bit order reversing on the rows and columns of that portion, a ¼-reduced coded image (hereinafter referred to as "reduced decoded image" where appropriate) shown in FIG. 13D in which the resolution is ¼ (½ in terms of either of the horizontal and vertical resolutions) of that of the original image (FIG. 13A) is can be obtained.

Figure 14:
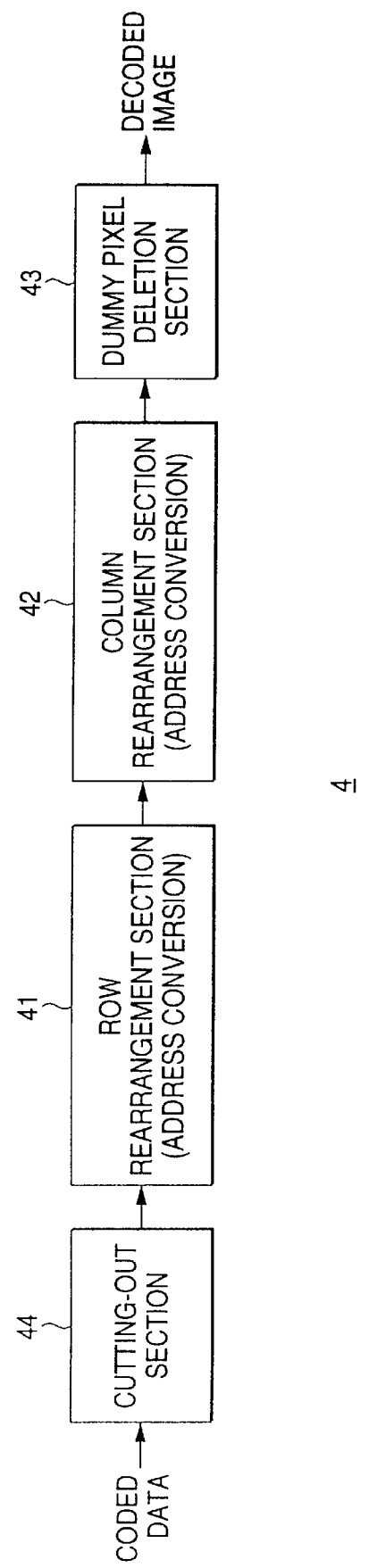
FIG. 14 is a block diagram showing a second functional block diagram of the decoder 4 shown in FIG. 1.

In view of the above, FIG. 14 shows an example functional configuration of a decoder 4 that produces such a reduced decoded image. The components in FIG. 14 having corresponding components in FIG. 11 are given the same reference numerals as the latter. The decoder 4 of FIG. 14 is configured in the same manner as that of FIG. 11 except that a cutting-out section 44 is provided upstream of the row rearrangement section 41.

The cutting-out section 44 is so configured that coded data are input to it. The cutting-out section 44 cuts out part of the received coded data and supplies the cut-out coded data to the row rearrangement section 41. The row rearrangement section 41, the column rearrangement section 42, and the dummy pixel deletion section 43 perform basically the same operations as those in FIG. 11, whereby a reduced decoded image is output from the dummy pixel deletion section 43.

However, in the embodiment of FIG. 14, the row rearrangement section 41 performs row rearrangement based on the number of pixels in the vertical direction of the coded data that are supplied from the cutting-out section 44. Specifically, assume a case that the number of pixels in the horizontal direction of original coded data is 512 (=$2^9$), for example, and those coded data are supplied to the row rearrangement section 41 as they are. Since each vertical address is expressed by 9 bits, the row rearrangement section 41 moves rows at positions having vertical addresses 0 (000000000B), 1 (000000001B), 2 (000000010B), . . . to positions having vertical addresses 0 (000000000B), 256 (100000000B), 128 (010000000B), . . . that are obtained by performing bit order reversing on the former vertical addresses.

On the other hand, assume another case that the cutting-out section 44 decreases the number of pixels in the vertical direction of coded data to, for example, 256 that is ½ of the number of pixels in the vertical direction of the original coded data and supplies resulting coded data to the row rearrangement section 41. Since each vertical address is expressed by 8 bits, the row rearrangement section 41 moves rows at position having vertical addresses 0 (00000000B), 1 (00000001B), 2 (00000010B), . . . to positions having vertical addresses 0 (00000000B), 128 (10000000B), 64 (01000000B), that are obtained by performing bit order reversing on the former vertical addresses.

FIGS. 15–20 show a result of a simulation in which coded data are produced by performing bit order reversing on image data and part of the coded data are cut out and subjected to bit order reversing.

Figure 15:
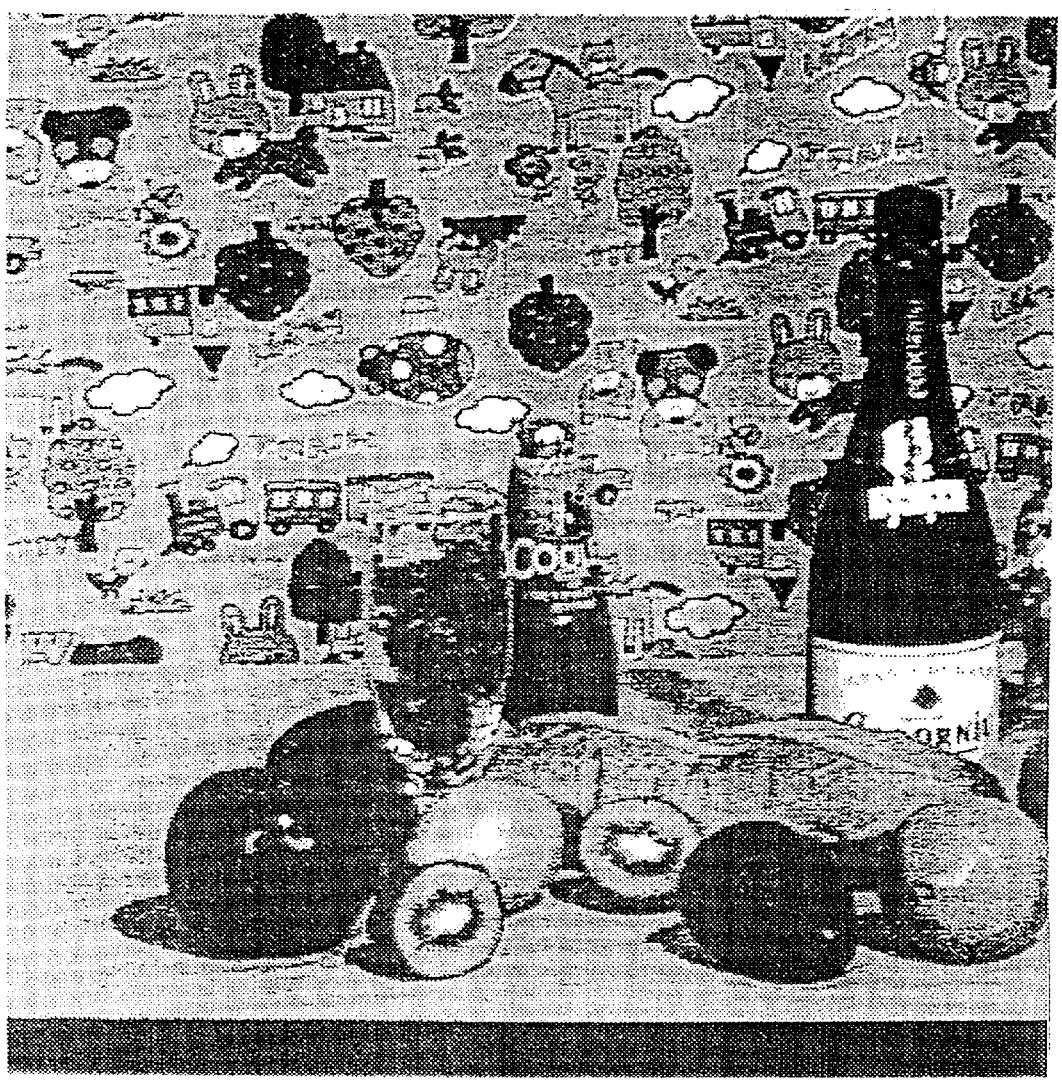
FIG. 15 is a halftone photograph displayed on a display that shows an original image used in a simulation.

FIG. 15 shows original image data to which dummy data are added. Because of the addition of the dummy data, both of the number of pixels in the horizontal direction and that in the vertical direction of the image shown in FIG. 15 are 512 that is a power of 2. That is, the bottom black portion in the image of FIG. 15 is the dummy data.

Figure 16:
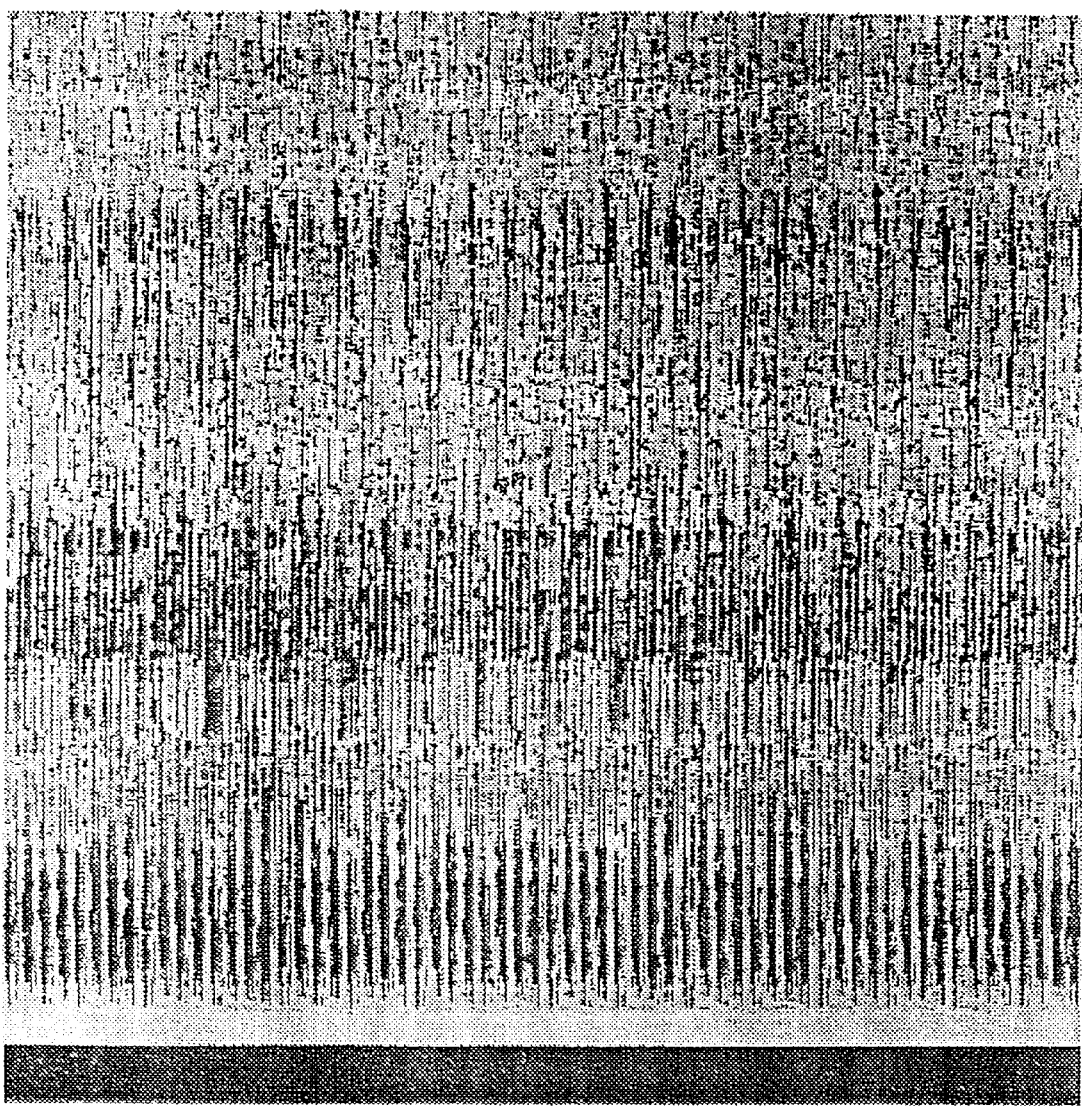
FIG. 16 is a halftone photograph displayed on the display that shows a result of column rearrangement (bit order reversing) on the image of FIG. 15.
Figure 17:
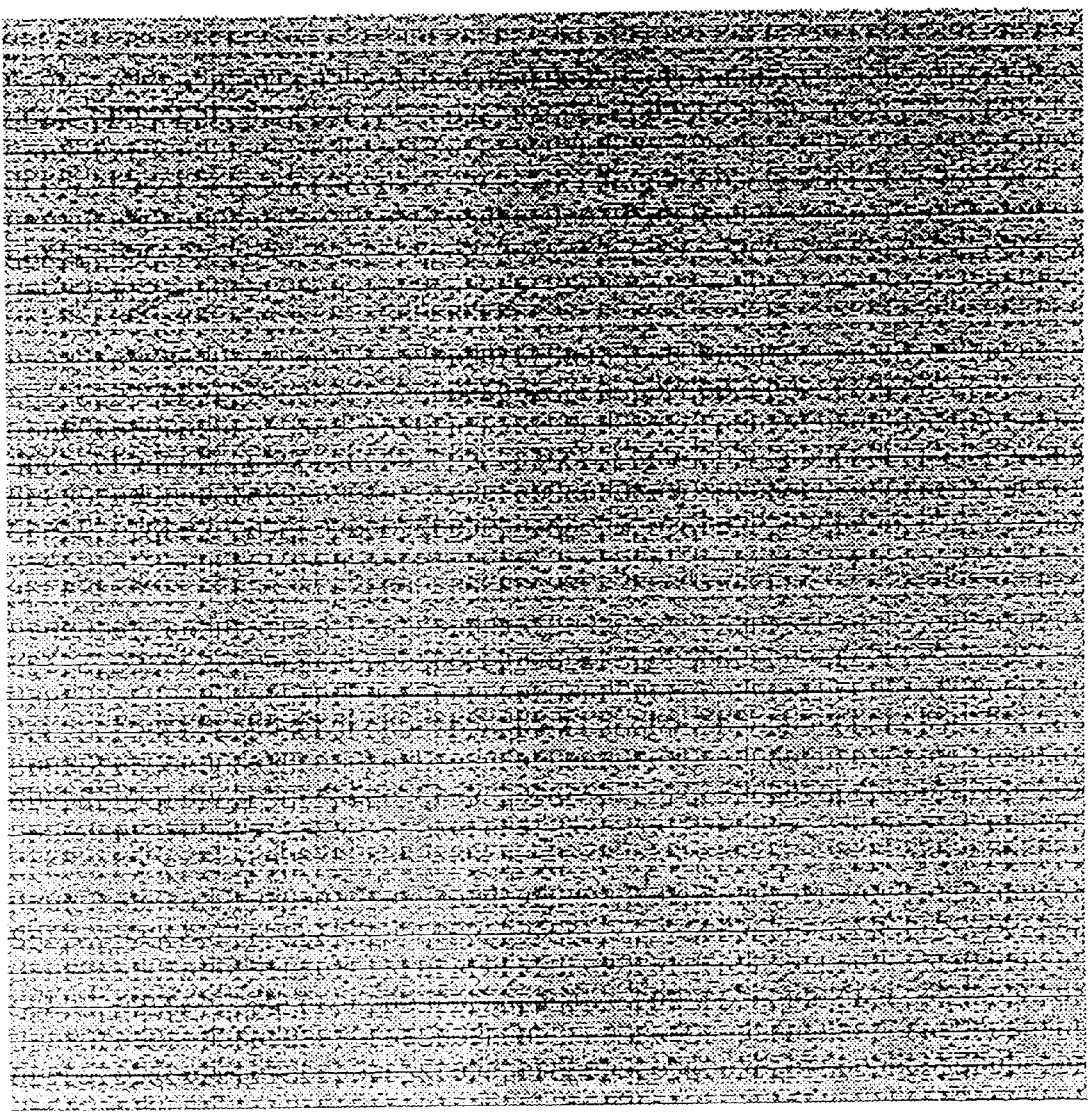
FIG. 17 is a halftone photograph displayed on the display that shows a result of row rearrangement (bit order reversing) on the image of FIG. 16.

FIG. 16 shows an image produced by performing column rearrangement (bit order reversing) on the image of FIG. 15. Further, FIG. 17 shows an image data, that is, coded data; produced by performing row rearrangement (bit order reversing) on the column-rearranged image of FIG. 16. The coded data of FIG. 17 have periodic black horizontal lines, which were generated as a result of distribution of the dummy data, that is, the bottom black portion in the image of FIG. 15.

Figure 18:
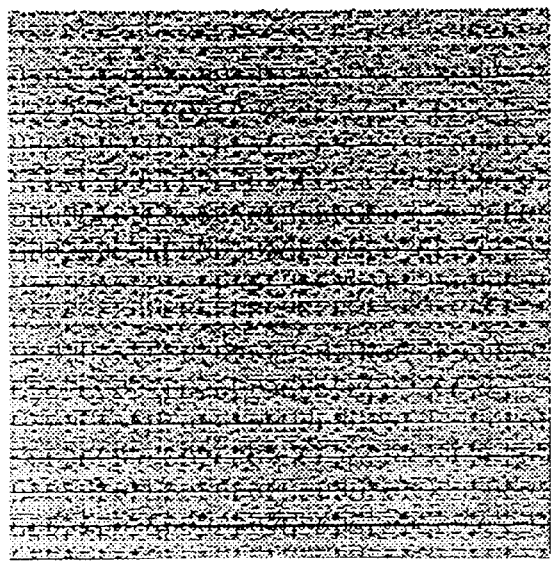
FIG. 18 is a halftone photograph displayed on the display that shows an image obtained by cutting out part of the image of FIG. 17.
Figure 19:
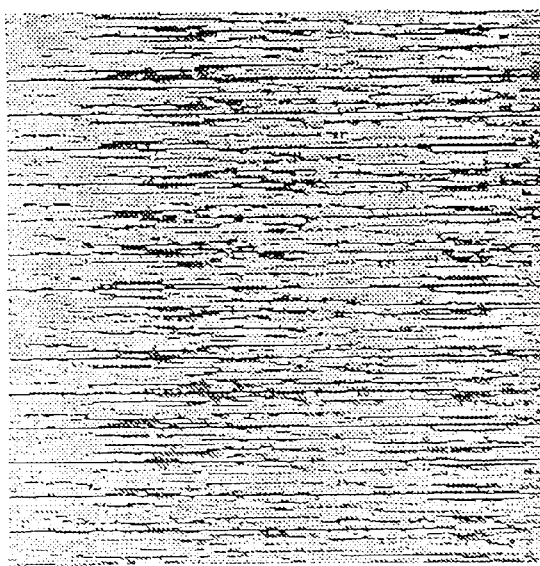
FIG. 19 is a halftone photograph displayed on the display that shows a result of column rearrangement (bit order reversing) on the image of FIG. 18.
Figure 20:
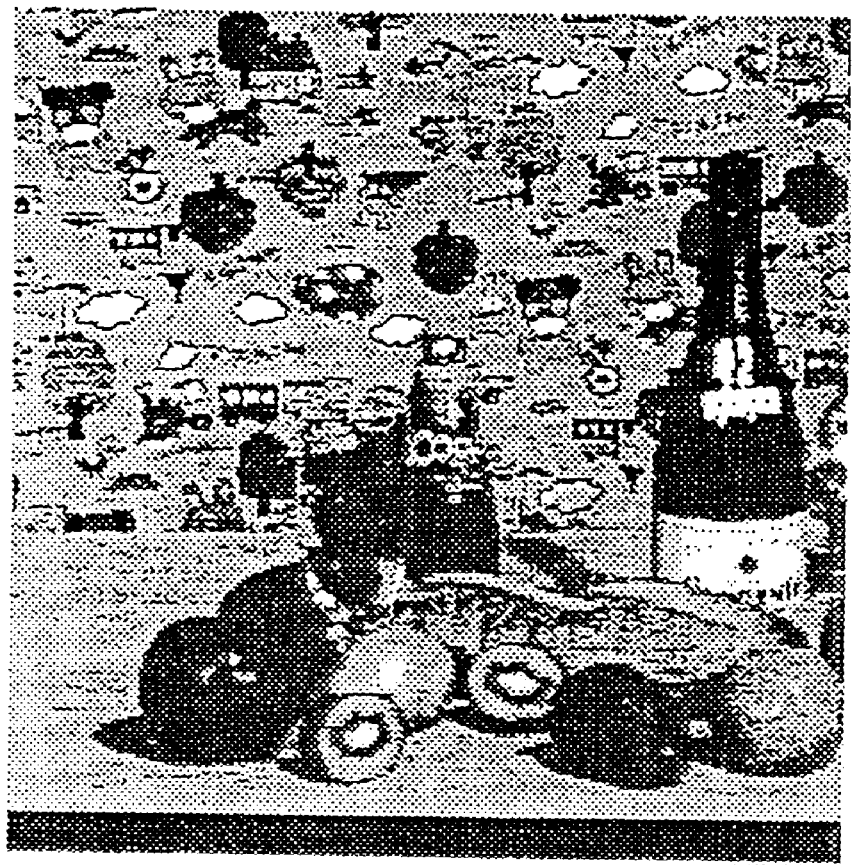
FIG. 20 is a halftone photograph displayed on the display that shows a result of row rearrangement (bit order reversing) on the image of FIG. 19.

FIG. 18 shows coded data obtained by cutting out the top-left ¼ portion of the coded data of FIG. 17. FIG. 19 shows coded data produced by column rearrangement (bit order reversing) on the columns of the coded data of FIG. 18. FIG. 20 shows coded data, that is, a reduced decoded image produced by row rearrangement (bit order reversing) on the column-rearranged coded data of FIG. 19.

It is seen from FIGS. 15 and 20 that an outline of the original image data is reproduced with high accuracy from part of the coded data. The bottom black portion in FIG. 20 is dummy data.

As described above, a reduced decoded image can be obtained from part of coded data that are obtained as a result of bit order reversing. Therefore, for example, even if the decoder 4 cannot receive all of coded data, it can still restore an outline of the original image data. Further, in displaying a decoded image obtained by the decoder 4 on a display device such as a CRT (cathode-ray tube) or a liquid crystal display, a reduced decoded image can be obtained that is suitable for the resolution of the display device by cutting out coded data in accordance with the resolution of the display device in the cutting-out section 44.

If the number of pixels in the horizontal or vertical direction of part of coded data that are cut out by the cutting-out section 44 shown in FIG. 14 is not equal to a power of 2, the cutting-out section 44 needs to add dummy data so that the number of pixels in the horizontal or vertical direction coincides with a power of 2, for example, in the same manner as the dummy pixel addition section 21 shown in FIG. 5 does, and supply resulting coded data to the row rearrangement section 41.

However, in this case, as described above, if dummy data are simply added to coded data at the bottom or left end, the dummy data are distributed through bit order reversing and a decoded image becomes such that the dummy data are inserted periodically as in the case of the coded data shown in FIG. 17. However, as described above, by giving the dummy data a value that the true image data cannot have, the dummy data that are inserted in the decoded image can be deleted.

Where the cutting-out section 44 cuts out, for example, a rectangular region of coded data that has, as the top-left apex, the top-left-most pixel of the coded data, a reduced decoded image as shown in FIG. 20 that is a reduced version of the original image can be obtained. However, if a region located at an arbitrary position is cut out from coded data, there may occur a case that a reduced decoded image that is not synchronized in the horizontal or vertical direction is obtained. In such a case, a reduced decoded image that is synchronized in both horizontal and vertical directions can be obtained by shifting the reduced decoded image in the horizontal or vertical direction. Even in the case where a region located at an arbitrary position is cut out from coded data, a reduced decoded image that is synchronized in both horizontal and vertical directions can be obtained if the cutting-out position is known.

In the encoder 1 of FIG. 5, if the number W of pixels in the horizontal direction of one frame is not equal to a power of 2, the dummy pixel addition section 21 adds dummy data to the image data in the horizontal direction by a difference between the number W of pixels and the minimum power of 2 ($2^M$) that is greater than W. Similarly, if the number H of pixels in the vertical direction is not equal to a power of 2, the dummy pixel addition section 21 adds dummy data to the image data in the vertical direction by a difference between the number H of pixels the minimum power of 2 ($2^N$) that is greater than H. Bit order reversing is performed on each of the rows and the columns of resulting image data of $2^M \times 2^N$ pixels, whereby coded data are obtained. However, since the thus-obtained coded data include the dummy data, if the coded data themselves are recorded on the recording medium 2 or transmitted via the transmission medium 3, the recording efficiency or the transmission efficiency lowers by an amount corresponding to the dummy data.

In the following, the minimum power of 2 that is greater than the number of pixels in the horizontal or vertical direction of image data will be called "minimum prescribed number of pixels."

On the other hand, even if dummy data are deleted from coded data to which the dummy data were added in the above-described manner, the minimum prescribed number of pixels can be recognized from the number of pixels of dummy-data-deleted coded data. If the minimum prescribed number of pixels is determined, a position in coded data to which image data at a certain position in the original image should be moved by bit order reversing is determined uniquely. Therefore, to which positions dummy data should be distributed in coded data that are obtained by performing bit order reversing on the dummy-data-added image data can be determined based on the minimum prescribed number of pixels. As a result, even if the dummy data are deleted from the coded data, where the dummy data were located in the coded data having t he dummy data can be recognized. And if the decoder 4 can recognize where the dummy data were located in the coded data, image data in which dummy data are added can be restored by inserting dummy data at the recognized positions and then performing bit order reversing.

It is concluded from the above discussion that the encoder 1 is allowed to output dummy-data-deleted coded data.

Figure 21:
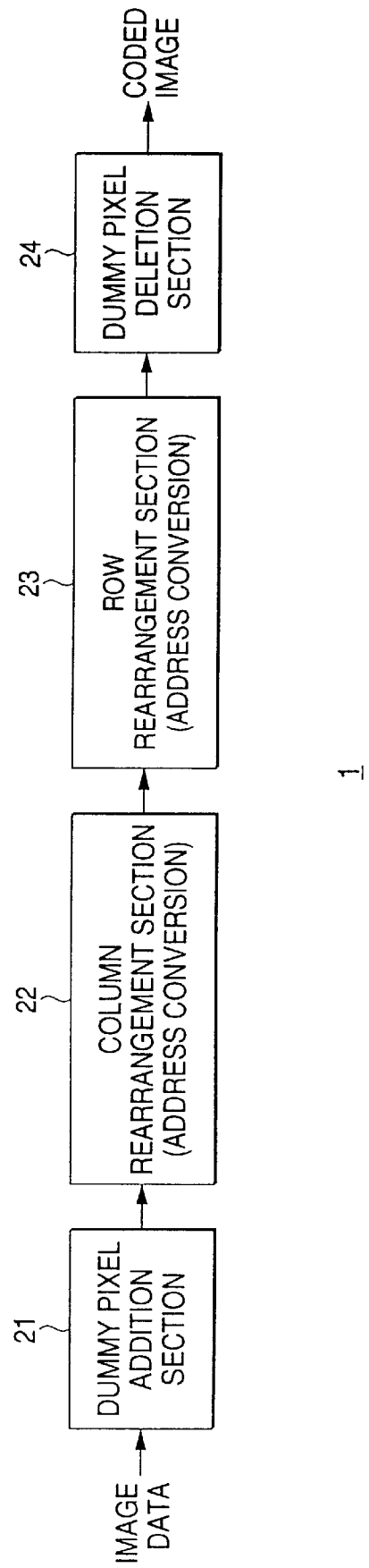
FIG. 21 is a second functional block diagram of the encoder 1 shown in FIG. 1.

FIG. 21 shows an example functional configuration of such an encoder 1. The components in FIG. 21 having corresponding components in FIG. 5 are given the same reference numerals a s the latter. That is, the encoder 1 of FIG. 21 is configured in the same manner as that of FIG. 5 except that a dummy pixel deletion section 24 is newly provided downstream of the row rearrangement section 23.

The dummy pixel deletion section 24 detects dummy data from coded data that are output from the row rearrangement section 23, deletes the dummy data, and outputs resulting data as final coded data.

Specifically, if, for example, coded data shown in FIG. 22A that are the same as the coded data shown in FIG. 7B are output from the row rearrangement section 23, the dummy pixel deletion section 24 deletes dummy data (shaded in FIG. 22A) from the coded data and outputs coded data shown in FIG. 22B that do not include the dummy data.

Specifically, in this case, the dummy pixel deletion section 24 deletes the dummy data that are distribute at the positions of the vertical addresses 3 and 7 in the coded data and outputs coded data of 8×6 pixels that are, so to speak, squeezed up after the deletion of the dummy data. Therefore, in the embodiment of FIG. 21, as a result of the squeezing-up due to the deletion of the dummy data at the position of the vertical address 3, the image data (*, 1), (*, 5), and (*, 3) that are located at the positions of the vertical addresses 4–6 in FIG. 22A are moved to the positions of the vertical addresses 3–5 as shown in FIG. 22B (mark "*" denotes a wild card).

Figure 23:
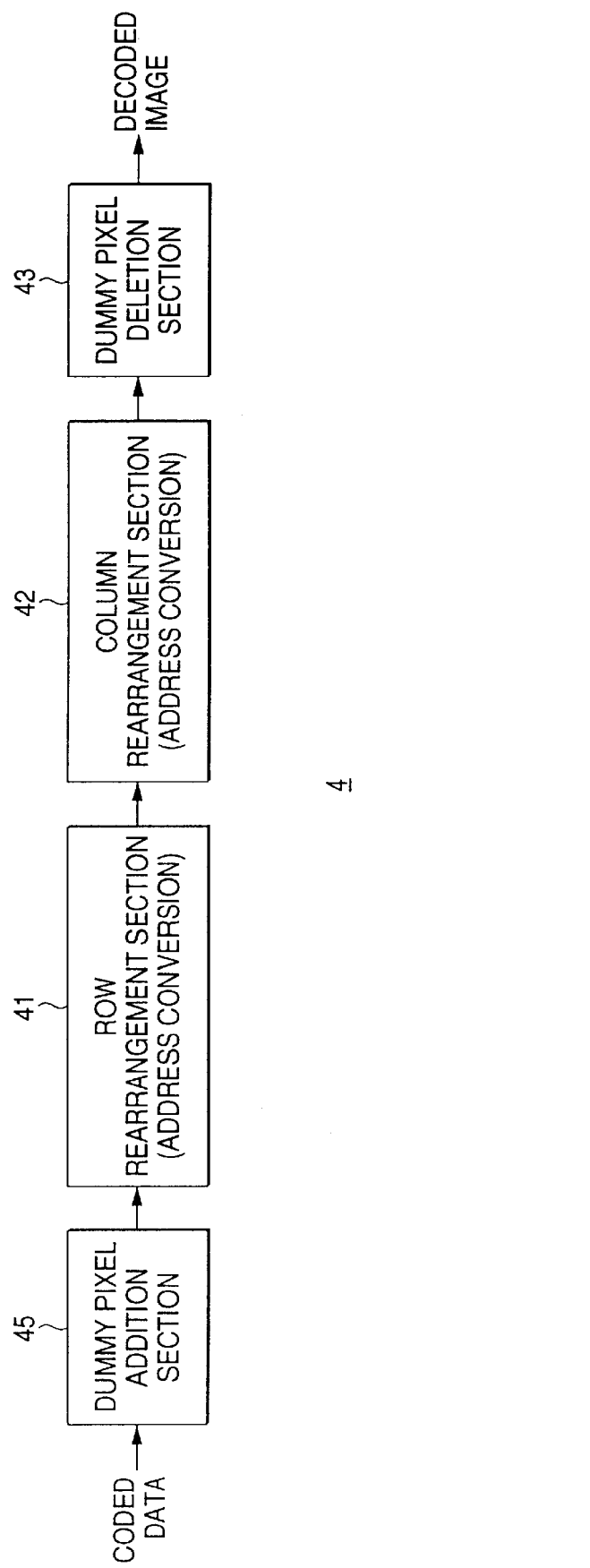
FIG. 23 is a third functional block diagram of the decoder 4 shown in FIG. 1.

FIG. 23 shows an example functional configuration of a decoder 4 for decoding coded data produced by deleting dummy data in the above manner. The components in FIG. 23 having corresponding components in FIG. 11 are given the same reference numerals as the latter. That is, the decoder 4 of FIG. 23 is configured in the same manner as that of FIG. 11 except that a dummy pixel addition section 45 is newly provided upstream of the row rearrangement section 41.

The dummy pixel addition section 45 receives dummy-data-deleted coded data and recognizes the minimum prescribed numbers of pixels from the numbers of pixels of the received coded data. Further, the dummy pixel addition section 45 recognizes a corresponding relationship between the addresses in the original image data and the addresses after bit order reversing from the minimum prescribed numbers of pixels and recognizes where dummy data that were added to the original image data were distributed in coded data by the bit order reversing. The dummy pixel addition section 45 inserts dummy data to the received coded data according to recognition results.

Specifically, when receiving the coded data of 8×6 pixels shown in FIG. 22B, the dummy pixel addition section 45 recognizes, based on the numbers 8 and 6 of pixels in the horizontal and vertical directions, respectively, that both of the minimum prescribed numbers of pixels in the horizontal and vertical directions are 8. In the coded data of FIG. 22B, although the number of pixels in the horizontal direction is 8 that is equal to the minimum prescribed number of pixels, the number of pixels in the vertical direction is 6 that is smaller than the minimum prescribed number of pixels by 2. Therefore, it becomes known that dummy data of two rows were inserted in the coded data.

Where the minimum prescribed number of pixels is 8, the corresponding relationship between the addresses in the original image data and the addresses after bit order reversing should be the relationship (1). Based on this corresponding relationship, the dummy pixel addition section 45 recognizes at which rows the dummy data of two rows that were added to the original image data at the bottom were distributed in the coded data. The dummy pixel addition section 45 adds dummy data at the thus-recognized rows. Specifically, in the case where the minimum prescribed number of pixels is 8, dummy data of two rows are added to the original image data at the bottom in the row direction in which the number of pixels of the original data is smaller than the minimum prescribed number of pixels by 2. The dummy data of two rows that were added to the original image data at the bottom should have been distributed at the positions having the vertical addresses 3 and 7 as is understood from the corresponding relationship (1). Therefore, the dummy pixel addition section 45 inserts dummy data to the coded data so that the dummy data are located at the positions having the vertical addresses 3 and 7.

The coded data to which the dummy data were added in the dummy pixel addition section 45 are supplied to the row rearrangement section 41 and processed there in the manner described above with reference to FIG. 11, whereby a decoded image is produced.

In the encoder 1 of FIG. 21, if the number of pixels in the horizontal or vertical direction of original image data is smaller than the minimum prescribed number of pixels, dummy data are added by an amount corresponding to the difference, then bit order reversing is performed, and then the dummy data are deleted. However, other methods are possible. For example, it is possible to prepare a function that has, as an argument, the number of pixels in the horizontal or vertical direction of original image data and determines a corresponding relationship between the addresses in the original image data and the addresses after dummy data deletion or a table that describes such a corresponding relationship, and to convert the original image data into coded data having no dummy data by using the function or table. Similarly, in the decoder 4 of FIG. 23, it is possible to prepare such a function or table and convert coded data having no dummy data into the original image data. In this case, it is not necessary to actually perform an operation of adding or deleting dummy data. However, the use of the above-described function or table is equivalent to virtual addition or deletion of dummy data.

If the number of data as an object of conversion is equal to $2^N$, the bit order reversing can be performed by arranging $2^0+2^1+2^2+\ldots+2^{N-1}$ switches in what is called a binary tree structure.

Figure 24:
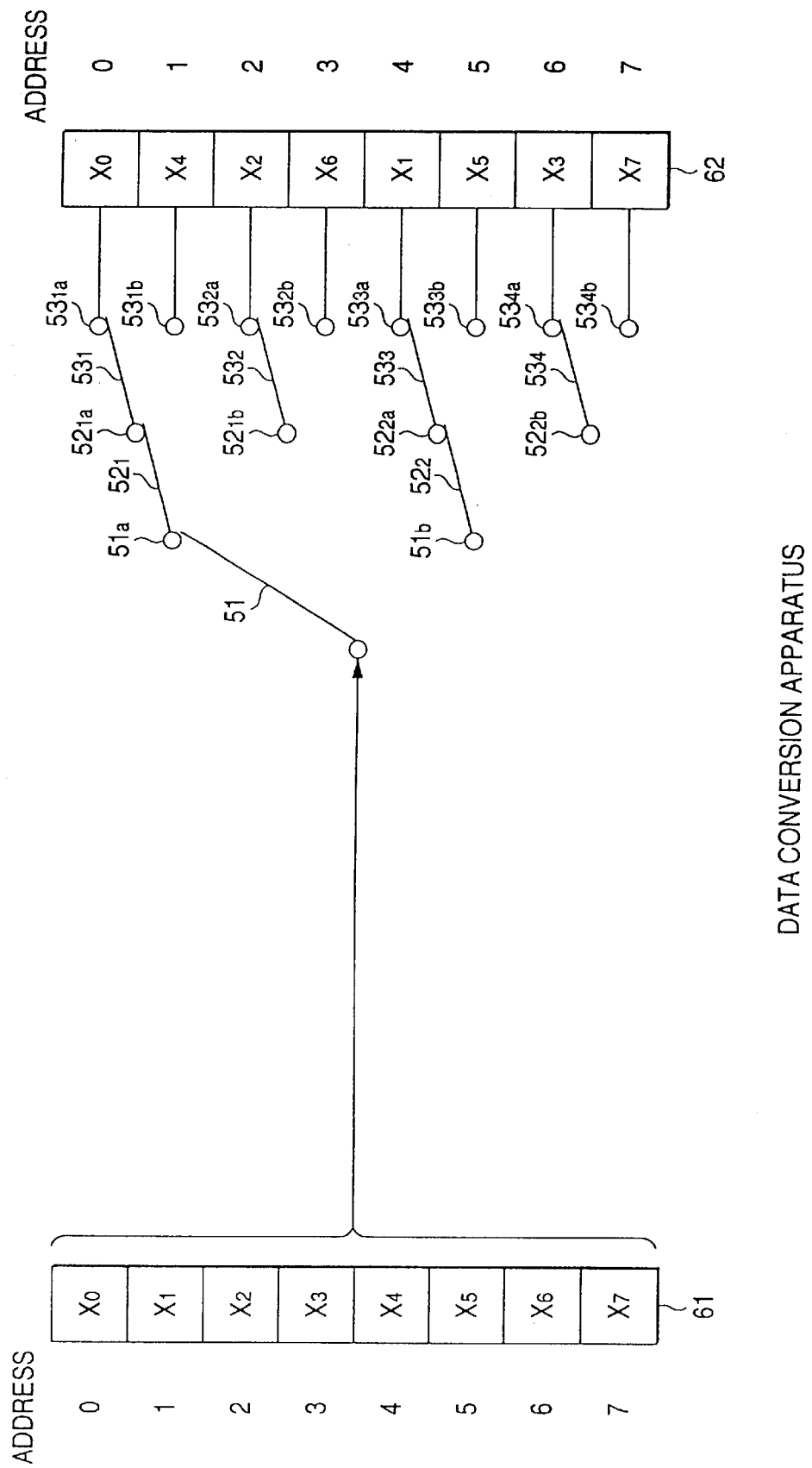
FIG. 24 is a block diagram showing an example hardware configuration of a data conversion apparatus according to of another embodiment of the invention.

FIG. 24 shows an example configuration of an embodiment of a data conversion apparatus that performs bit order reversing with switches that are arranged in such a structure. In this example, an object of conversion is 8 (=$2^3$) data $x_0$, $x_1$, $x_2$, $x_3$, $x_4$, $x_5$, $x_6$, and $x_7$, for example, and hence the data conversion apparatus has $2^0+2^1+2^2=7$ switches 51, $52_1$, $52_2$, $53_1$, $53_2$, $53_3$, and $53_4$.

The eight conversion object data $x_0$–$x_7$ are stored in a memory 61 at respective addresses #0–#7 in this order. The switch 51 is so configured as to sequentially read out the data $x_0$–$x_7$ that are stored in the memory 61 at the respective addresses #0–#7 in synchronism with a prescribed clock signal (hereinafter referred to as "readout clock signal" where appropriate).

The switch 51 is so configured as to alternately select a terminal 51$a$ that is connected to the switch $52_1$ and a terminal 51$b$ that is connected to the switch $52_2$ in synchronism with a clock signal whose period is $2^0$ times the period of the readout clock signal, that is, in synchronism with the readout clock signal itself. The switch $52_1$ is so configured as to alternately select a terminal $52_1a$ that is connected to the switch $53_1$ and a terminal $52_1b$ that is connected to the switch $53_2$ in synchronism with a clock signal whose period is $2^1$ times the period of the readout clock signal. The switch $52_2$ is so configured as to alternately select a terminal $52_2a$ that is connected to the switch $53_3$ and a terminal $52_2b$ that is connected to the switch 534 in synchronism with a clock signal whose period is $2^1$ times the period of the readout clock signal.

The switches $53_1$–$53_4$ are so configured as to alternately select terminals $53_1a$ and $53_2b$, terminals $53_2a$ and $53_2b$, terminals $53_3a$ and $53_3b$, and terminal s $53_4a$ and $53_4b$, respectively, in synchronism with a clock signal whose period is $2^2$ times the period of the readout clock signal. The terminals $53_1a$, $53_1b$, $53_2a$, $53_2b$, $53_2a$, $53_3b$, $53_4a$, and $53_4b$ are connected to the addresses #0–#7 of a memory 62, respectively.

In the above-configured data conversion apparatus, at a time point when the switch 51 reads out the data $x_0$ from the address #0 of the memory 61, the switch 51 selects the terminal 51$a$, the switch $52_1$ selects the terminal $52_1$ the switch $52_2$ selects the terminal $52_2a$, the switch 53 selects the terminal $53_1a$, the switch $53_2$ selects the terminal $53_2a$, the switch $53_3$ selects the terminal $53_3a$, and the switch $53_4$ selects the terminal $53_4a$. As a result, the data $x_0$ that is stored in the memory 61 at the address #0 is supplied to the address #0 of the memory 62 via the switch 51, the terminal 51$a$, the switch $52_1$, the terminal $52_1a$, the switch $53_1$, and the terminal $53_1a$ and stored therein.

At a time point when the switch 51 reads out the data $x_1$ from the address #1 of the memory 61, the switch 51 is switched from the terminal 51$a$ to the terminal 51$b$. The switches $52_1$ and $52_2$ continue to select the terminal $52_1a$ and the terminal $52_2a$, respectively. The switches $53_1$, $53_2$, $53_3$, and $53_4$ continue to select the terminal $53_1a$, the terminal $53_2a$, the terminal $53_3a$, and the terminal $53_4a$, respectively. As a result, the data $x_1$ that is stored in the memory 61 at the address #1 is supplied to the address #4 of the memory 62 via the switch 51, the terminal 51$b$, the switch $52_2$, the terminal $52_2a$, the switch $53_3$, and the terminal $53_3a$ and stored therein.

At a time point when the switch 51 reads out the data $x_2$ from the address #2 of the memory 61, the switch 51 is switched from the terminal 51$b$ to the terminal 51$a$. The switch $52_1$ is switched from the terminal $52_1a$ to the terminal $52_1b$ and the switch $52_2$ is switched from the terminal $52_2a$ to the terminal $52_2b$. The switches $53_1$, $53_2$, $53_3$, and $53_4$ continue to select the terminals $53_1a$, $53_2a$, $53_3a$, and $53_4a$, respectively. As a result, the data $x_2$ that is stored in the memory 61 at the address #2 is supplied to the address #2 of the memory 62 via the switch 51, the terminal 51$a$, the switch $52_1$, the terminal $52_1b$, the switch $53_2$, and the terminal $53_2a$ and stored therein.

At a time point when the switch 51 reads out the data $x_3$ from the address #3 of the memory 61, the switch 51 is switched from the terminal 51$a$ to the terminal 51$b$. The switches $52_1$ and $52_2$ continue to select the terminals $52_1b$ and $52_2b$, respectively. The switches $53_1$, $53_2$, $53_3$, and $53_4$ continue to select the terminals $53_1a$, $53_2a$, $53_3a$, and $53_4a$, respectively. As a result, the data $x_3$ that is stored in the memory 61 at the address #3 is supplied to the address #6 of the memory 62 via the switch 51, the terminal 51$b$, the switch $52_2$, the terminal $52_2b$, the switch $53_4$, and terminal $53_4a$ and stored therein.

At a time point when the switch 51 reads out the data $x_4$ from the address #4 of the memory 61, the switch 51 is switched from the terminal 51$b$ to the terminal 51$a$. The switch $52_1$ is switched from the terminal $52_1b$ to the terminal $52_1a$ and the switch $52_2$ is switched from the terminal $52_2b$ to the terminal $52_2a$. The switch $53_1$ is switched from the terminal $53_1a$ to the terminal $53_1b$, the switch $53_2$ is switched from the terminal $53_2a$ to the terminal $53_2b$, the switch 533 is switched from the terminal $53_3a$ to the terminal $53_3b$, and the switch $53_4$ is switched from the terminal $53_4a$ to the terminal $53_4b$. As a result, the data $x_4$ that is stored in the memory 61 at the address #4 is supplied to the address #1 of the memory 62 via the switch 51, the terminal 51$a$, the switch $52_1$, the terminal $52_1a$, the switch $53_1$ and the terminal $53_1b$ and stored therein.

At a time point when the switch 51 reads out the data $x_5$ from the address #5 of the memory 61, the switch 51 is switched from the terminal 51$a$ to the terminal 51$b$. The switches $52_1$ and $52_2$ continue to select the terminal $52_1a$ and the terminal $52_2a$, respectively. The switches $53_1$, $53_2$, $53_3$, and $53_4$ continue to select the terminals $53_1b$, $53_2b$, $53_3b$, and $53_4b$, respectively. As a result, the data $x_5$ that is stored in the memory 61 at the address #5 is supplied to the address #5 of the memory 62 via the switch 51, the terminal 51$b$, the switch 522, the terminal $52_2a$, the switch $53_3$, and the terminal $53_3b$ and stored therein.

At a time point when the switch 51 reads out the data $x_6$ from the address #6 of the memory 61, the switch 51 is switched from the terminal 51$b$ to the terminal 51$a$. The switch $52_1$ is switched from the terminal $52_1a$ to the terminal $52_1b$ and the switch $52_2$ is switched from the terminal $52_2a$ to the terminal $52_2b$. The switches $53_1$, $53_2$, $53_3$, and $53_4$ continue to select the terminals $53_1b$, $53_2b$, $53_3b$, and $53_4b$, respectively. As a result, the data $x_6$ that is stored in the memory 61 at the address #6 is supplied to the address #3 of the memory 62 via the switch 51, the terminal 51$a$, the switch $52_1$, the terminal $52_1b$, the switch $53_2$ and the terminal $53_2b$ and stored therein.

At a time point when the switch 51 reads out the data $x_7$ from the address #7 of the memory 61, the switch 51 is switched from the terminal 51$a$ to the terminal 51$b$. The switches $52_1$ and $52_2$ continue to select the terminal $52_1b$ and the terminal $52_2b$, respectively. The switches $53_1$, $53_2$, $53_3$, and $53_4$ continue to select the terminals $53_1b$, $53_2b$, $53_3b$, and $53_4b$, respectively. As a result, the data $x_7$ that is stored in the memory 61 at the address #7 is supplied to the address #7 of the memory 62 via the switch 51, the terminal 51b, the switch $52_2$, the terminal $52_2b$, the switch $53_4$, and the terminal $53_4b$ and stored therein.

Therefore, the data $x_0$, $X_4$, $x_2$, $x_6$, $x_1$, $x_5$, $x_3$, and $x_7$ are stored in the memory 62 at the respective addresses #0–#7, whereby the data list $x_0$–$x_7$ stored in the memory 61 is converted according to the corresponding relationship (1).

The data list can be converted in the same manner as in the above case by connecting the terminals 53a, $53_1b$, $53_2a$, $53_2b$, $53_3a$, $53_3b$, $53_4a$, and $53_4b$ to the addresses #0–#7 of the memory 61 in FIG. 24, reading out the data stored in the memory 61 at those addresses from the switch 51 side, and sequentially storing the read-out data in the memory 62 at the addresses #0–#7.

Further, a data list $x_0$, $x_4$, $x_2$, $x_6$, $x_1$, $x_5$, $x_3$, and $x_7$ that are stored in the memory 62 can be converted into the original data list $x_0$, $x_1$, $x_2$, $x_3$, $x_4$, $x_5$, $x_6$, and $x_7$ by storing the data $x_0$, $x_4$, $x_2$, $x_6$, $x_1$, $x_5$, $x_3$, and $x_7$ in the memory 61 at the respective addresses #0–#7 and then performing the same operation as described above.

The data conversion apparatus of FIG. 24 is equivalent to the encoder 1 of FIG. 2 and hence is also equivalent to the decoder 4 of FIG. 8. That is, the seven switches 51, $52_1$, $52_2$, and $53_1$–$53_4$ determine at which address of the memory 62 data stored at each address of the memory 61 should be written. Therefore, the memories 61 and 62 correspond to the image memory 11 in FIG. 2 and the switches 51, $52_1$, $52_2$, and $53_1$–$53_4$ correspond to the write address generation circuit 14 or the read address generation circuit 15.

As described above, since data are moved to a position corresponding to an address that is represented by a bit sequence that is obtained by reversing the order of a bit sequence as a binary representation of the address of the data, a data encoding process and a data decoding process coincide with each other if each series of data as a unit of rearrangement consists of data of a number that is equal to a power of 2. Even if each series of data as a unit of rearrangement consists of data of a number that is not equal to a power of 2, a data encoding process and a data decoding process are uniquely determined by the number of data. Therefore, it becomes possible to distribute data or restore the original data (i.e. concentrate data) by a simpler process than in the case of distributing data by using random numbers or the like.

In the above embodiments, if the number of pixels of image data is not equal to a power of 2, dummy data are added by a difference between the number of pixels and the minimum power of 2 that is greater than the number of pixels. It is also possible to add dummy data by a difference between the number of pixels and a non-minimum power of 2 that is greater than the number of pixels of image data. However, this is not preferable in terms of processing efficiency because the data amount of added dummy data increases.

Although the above embodiments are directed to the case of distributing spatially localized image data (or concentrating spatially distributed data), the invention can be applied to other cases, for example, a case of distributing temporally localized data.

Further, although in the above embodiments the object of processing is image data, it is possible to make other kinds of data, for example, audio data, an object of processing.

Although the above embodiments do not refer to it, the bit order reversing has a data encryption effect as is apparent from the simulation result of FIG. 17.

Further, although in the above embodiments the positions of the pixels constituting image data are specified separately in the row direction and the column direction by using two kinds of addresses, that is, horizontal addresses and vertical addresses, it is possible to specify the positions of the pixels in other ways, for example, by a single sequence of addresses that are arranged in raster scanning order. However, while in the case of specifying the positions of pixels by using two kinds of addresses (horizontal addresses and vertical addresses) the horizontal addresses and the vertical addresses reflect the horizontal positions and the vertical positions, respectively, in the case of specifying the positions of pixels by a single sequence of addresses that are arranged in raster scanning order, the addresses do not reflect the vertical positions though they reflect the horizontal positions. That is, with attention paid to, for example, a central portion of an image, although sequential addresses that are arranged in raster scanning order reflect the closeness or distantness between pixels arranged in the horizontal direction, they do not reflect the closeness or distantness between pixels arranged in the vertical direction. (As long as the horizontal direction is concerned, if the address values of two pixels are close to each other, they are close to each other spatially. However, as long as the vertical direction is concerned, two pixels having much different address values may be close to each other spatially.) As a result, in the case of specifying the positions of pixels by using a single sequence of addresses that are arranged in raster scanning order, it may become difficult to obtain a reduced decoded image that reflects the contents of the original image by cutting out part of coded data and performing bit order reversing thereon.

For example, the invention can be implemented by causing a computer to execute a computer program for execution of any of the above-described processes or by using dedicated hardware. In the case of using a computer program, the computer program can be provided by recording it on any of an optical disc, a magneto-optical disc, a magnetic disk, a magnetic tape, a phase change disc, a semiconductor memory, and other recording media or by transmitting it via any of the Internet, a CATV (cable television) network, a satellite channel, ground waves, and other transmission media.

Coded data obtained through conversion according to any of the embodiments of the invention may be distributed as a signal. Such a signal is very robust because data are dispersed therein. That is, such a signal makes it possible to provide a decoded image that is close to the original image even at the occurrence of local packet loss.

Further, although in the embodiments of the invention the distribution and concentration are realized by converting a bit sequence as a binary representation of positional information of image data, the same advantages can be obtained by converting a sequence of numbers that is a ternary number, for example.

For example, ternary representations of pieces of positional information of decimal numbers 0, 1, 2, 3, 4, 5, 6, ... are 000, 001, 002, 010, 011, 012, 020, ..., respectively. When the order of the sequence of numbers is reversed, the above ternary numbers are converted into 000, 100,200, 010, 110,210, 202, ..., whose decimal representations are 0, 9, 18, 3, 12, 21, 6, ..., respectively. It is understood that the same advantages as described above can be obtained.

That is, the advantages of the invention can be obtained by reversing the order of a sequence of numbers that is an N-ary number (N is a natural number that is greater than or equal to 2).

What is claimed is:

1. A data conversion apparatus for converting first data into second data, comprising:

input means for receiving the first data; and converting means for converting the first data into the second data by moving each of the first data a position of which is represented by first positional information that is an N-ary number to a position represented by second positional information that is a sequence of numbers obtained by reversing order of a sequence of numbers of the N-ary number as the first positional information, where N is a natural number that is greater than or equal to 2.

2. The data conversion apparatus according to claim 1, wherein the converting means moves each of the first data a position of which is represented by first positional information that is a bit sequence to a position of second positional information that is a bit sequence obtained by reversing order of the bit sequence as the first positional information.

3. The data conversion apparatus according to claim 1, wherein the converting means rearranges positions of the first data in units of the first data, each of the units consisting of first data of a number that is equal to a power of N.

4. The data conversion apparatus according to claim 3, further comprising adding means for adding dummy data to the first data so that the first data come to consist of data of a number that is equal to a power of N.

5. The data conversion apparatus according to claim 4, further comprising deleting means for deleting the dummy data from the second data that were obtained by rearranging positions of the first data to which the dummy data were added.

6. The data conversion apparatus according to claim 1, further comprising cutting-out means for cutting out part of the first data, wherein the converting means rearranges positions of the part of the first data that have been cut out by the cutting-out means.

7. The data conversion apparatus according to claim 1, wherein:

the first data and the second data are image data;

the first positional information consists of horizontal positional information and vertical positional information of the image data as the first data; and the second positional information consists of a sequence of numbers obtained by reversing order of a sequence of numbers as an N-ary representation of the horizontal positional information and a sequence of numbers obtained by reversing order of a sequence of numbers as an N-ary representation of the vertical positional information.

8. A data conversion method for converting first data into second data, comprising:

an input step of receiving the first data; and a converting step of converting the first data into the second data by moving each of the first data a position of which is represented by first positional information that is an N-ary number to a position of second positional information that is a sequence of numbers obtained by reversing order of a sequence of numbers of the N-ary number as the first positional information, where N is a natural number that is greater than or equal to 2.

9. A data conversion system for performing data conversion, comprising:

first converting means for converting first data into second data by moving each of the first data a position of which is represented by first positional information that is an N-ary number to a position of second positional information that is a sequence of numbers obtained by reversing order of a sequence of numbers of the N-ary number as the first positional information, where N is a natural number that is greater than or equal to 2; and second converting means for converting the second data into the first data by moving each of the second data a position of which is represented by second positional information that is an N-ary number to a position of first positional information that is a sequence of numbers obtained by reversing order of a sequence of numbers of the N-ary number as the second positional information.

10. A data conversion apparatus for converting data, comprising:

storing means in which the data are stored according to write addresses and from which the stored data are read out according to read addresses; and address generating means for generating sequential first addresses, generating second addresses obtained by reversing order of a sequence of numbers as an N-ary representation of each of the first addresses, and supplying the storing means with one of the first addresses and the second addresses as the write addresses and the other as the read addresses, where N is a natural number that is greater than or equal to 2.

11. A data conversion method for converting data, comprising the steps of:

generating sequential first addresses, and generating second addresses obtained by reversing order of a sequence of numbers as an N-ary representation of each of the first addresses, where N is a natural number that is greater than or equal to 2;

storing the data by using one of the first addresses and the second addresses as write addresses; and reading out the stored data by using the other of the first addresses and the second addresses as read addresses.

12. A recording medium storing a computer-controllable program for converting first data into second data, the program comprising:

an input step of receiving the first data; and a converting step of converting the first data into the second data by moving each of the first data a position of which is represented by first positional information that is an N-ary number to a position of second positional information that is a sequence of numbers obtained by reversing order of a sequence of numbers of the N-ary number as the first positional information, where N is a natural number that is greater than or equal to 2.

13. A recording medium storing second data that have been produced by converting first data by moving each of the first data a position of which is represented by first positional information that is an N-ary number to a position of second positional information that is a sequence of numbers obtained by reversing order of a sequence of numbers of the N-ary number as the first positional information, where N is a natural number that is greater than or equal to 2.

* * * * *